US009667977B2

(12) United States Patent
Kumakura et al.

(10) Patent No.: US 9,667,977 B2
(45) Date of Patent: May 30, 2017

(54) PICTURE DECODING DEVICE, PICTURE DECODING METHOD, AND PICTURE DECODING PROGRAM

(71) Applicant: JVC KENWOOD Corporation, Yokohama-shi (JP)

(72) Inventors: Toru Kumakura, Yokosuka (JP); Shigeru Fukushima, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 92 days.

(21) Appl. No.: 14/478,788

(22) Filed: Sep. 5, 2014

(65) Prior Publication Data

US 2014/0376627 A1 Dec. 25, 2014

Related U.S. Application Data

(63) Continuation of application No. PCT/JP2013/002033, filed on Mar. 26, 2013.

(30) Foreign Application Priority Data

Mar. 26, 2012 (JP) ................................ 2012-069718
Mar. 26, 2012 (JP) ................................ 2012-069719

(Continued)

(51) Int. Cl.
*H04N 19/593* (2014.01)
*H04N 19/176* (2014.01)
(Continued)

(52) U.S. Cl.
CPC ........... *H04N 19/176* (2014.11); *H04N 19/13* (2014.11); *H04N 19/18* (2014.11); *H04N 19/593* (2014.11); *H04N 19/70* (2014.11); *H04N 19/91* (2014.11)

(58) Field of Classification Search
CPC ...... H04N 19/13; H04N 19/176; H04N 19/18; H04N 19/593; H04N 19/70; H04N 19/91;
(Continued)

(56) References Cited

U.S. PATENT DOCUMENTS 6,480,537 B1 * 11/2002 Agrawal .............. H04N 21/235
375/240
2005/0123207 A1 * 6/2005 Marpe .................. H04N 19/196
382/239

(Continued)

FOREIGN PATENT DOCUMENTS

JP 2007-300517 A 11/2007

OTHER PUBLICATIONS

Nguyen et al., "Context Set Selection for Coefficient Level Coding," Joint Collaborative Team on Video Coding (JCT-VC) of ITU-T SG16 WP3 and ISO/IEC JTC1/SC29/WG11, 8th Meeting: San Jose, Feb. 1-10, 2012.

(Continued)

*Primary Examiner* — Nathnael Aynalem
(74) *Attorney, Agent, or Firm* — Venable LLP; Michael A. Sartori; Ilya A. Svetlov

(57) ABSTRACT

In a picture coding device, a significant coefficient information coding controller 706 and an arithmetic encoder 701 code significant difference coefficient information indicating that a difference coefficient value is not zero and significant for each of the difference coefficients in the partial region of the coding target. A difference coefficient value coding controller 707 and the arithmetic encoder 701 code difference coefficient values when significant difference coefficient information is significant for each of pixels in the partial region of the coding target. The significant coefficient information coding controller 706 decides a context for coding the significant difference coefficient information in (Continued)

the partial region of the coding target based on information indicating significance of the difference coefficient in the coded partial region.

3 Claims, 20 Drawing Sheets

(30) Foreign Application Priority Data

Mar. 25, 2013 (JP) .................................. 2013-062961
Mar. 25, 2013 (JP) .................................. 2013-062962

(51) Int. Cl.
*H04N 19/159* (2014.01)
*H04N 19/91* (2014.01)
*H04N 19/70* (2014.01)
*H04N 19/13* (2014.01)
*H04N 19/18* (2014.01)

(58) Field of Classification Search
CPC .... H04N 19/109; H04N 19/11; H04N 19/159; H04N 19/50; H04N 19/52; H04N 19/17; H04N 19/174; H03M 7/4018
USPC .......................................... 375/240.01–240.29
See application file for complete search history.

(56) References Cited

U.S. PATENT DOCUMENTS

| | | | | |
|---|---|---|---|---|
| 2008/0219578 A1* | 9/2008 | Lee | ........................ | H04N 19/13 382/247 |
| 2009/0296806 A1* | 12/2009 | Hsu | ...................... | H03M 7/4006 375/240.01 |
| 2012/0082232 A1* | 4/2012 | Sole Rojals | .......... | H04N 19/176 375/240.18 |
| 2012/0082233 A1* | 4/2012 | Sze | ........................ | H04N 19/13 375/240.18 |
| 2012/0207400 A1* | 8/2012 | Sasai | ...................... | H04N 19/13 382/233 |
| 2012/0230417 A1* | 9/2012 | Sole Rojals | ...... | H04N 19/00109 375/240.18 |
| 2013/0195200 A1* | 8/2013 | Nguyen | .................. | H04N 19/13 375/240.25 |

OTHER PUBLICATIONS

Extended European Search Report in European Patent Application No. 13767569.0, dated Oct. 28, 2015.
International Search Report in PCT International Application No. PCT/JP2013/002033, dated Jul. 2, 2013.
International Preliminary Report on Patentability and Written Opinion in PCT International Application No. PCT/JP2013/002033, dated Oct. 1, 2014.
Bross et al., "High efficiency video coding (HEVC) text specification draft 6," Joint Collaborative Team on Video Coding (JCT-VC) of ITU-T SG16 WP3 and ISO/IEC JTC1/SC29/WG11, 7th Meeting: Geneva, CH, Nov. 21-30, 2011, 5 total pages, Document: JCTVC-H1003.
Kumakura et al.,"Non-CE3: Simplified context deprivation for significance map," Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012 [Cited in Office Action in counterpart European Patent Application No. 13767569.0, dated Oct. 11, 2016].
Nakamura et al., "Cross verification of Refined significant map context deprivation for large TU (JCTVC-J0068)," Joint Collaborative Team on Video Coding (JCT-VC) of ITU-T SG 16 WP 3 and ISO/IEC JTC 1/SC 29/WG 11, 10th Meeting; Stockholm, SE, Jul. 11-20, 2012 [Cited in Office Action in counterpart European Patent Application No. 13767569.0, dated Oct. 11, 2016].
Auyeung, "Additional horizontal and vertical scan for transform coefficients," Joint Collaborative Team on Video Coding (JCT-VC) of ITU-SG 16 WP 3 and ISO/IEC JTC 1/SC 29/WG 11, 10th Meeting: Stockholm, SE, Jul. 11-20, 2012 [Cited in Office Action in counterpart European Patent Application No. 13767569.0, dated Oct. 11, 2016].

* cited by examiner

PRIOR ART

PICTURE DECODING DEVICE, PICTURE DECODING METHOD, AND PICTURE DECODING PROGRAM

BACKGROUND

Field of the Invention

The present invention relates to picture coding and decoding technique, and more particularly, to entropy coding and decoding techniques of residual signals.

In MPEG-4 AVC as an international standard for moving picture coding, context-adaptive binary arithmetic coding called CABAC is employed as an entropy coding scheme. In the CABAC, a plurality of variables called a context for storing a probability of occurrence of information to be coded are used. An optimal context is selected from neighboring coding information and used for coding. Since a probability of occurrence is updated by a coding process in each context, it is possible to estimate a probability of occurrence of coding information with a high degree of accuracy and perform efficient coding.

RELATED ART LIST

Patent Document

Patent Literature 1: JP 2007-300517 A

In MPEG-4 AVC, as a context is switched based on decoded neighboring information, learning of a probability of occurrence based on a decoding result is performed in addition to estimation of a probability of occurrence of information. It is possible to optimize a probability of occurrence of information to be decoded for each context, and thus coding efficiency is improved. However, it is necessary to sequentially process a calculation of a context index and decoding of significant difference coefficient information for all significant difference coefficient information in a processing target block, and thus it takes a time to calculate.

Patent Literature 1 discloses a technique of arranging a context for a syntax element having a high frequency of occurrence on a memory having small access latency and reducing a processing delay related to decoding. However, the technique disclosed in Patent Literature 1 does not solve dependence of a calculation of a context index and decoding a syntax element and is not an essential solution to a processing delay since it is difficult to perform the calculation and the decoding in parallel.

SUMMARY

The present invention was made in light of the foregoing, and it is an object of the present invention to provide picture coding and decoding techniques that are capable of performing parallel processing and thus implementing a context index calculating method having a small computation amount in difference coefficient coding/decoding and that are simple in a circuit configuration and suitable for real-time processing. It is another object of the present invention to provide picture coding and decoding techniques capable of implementing high coding efficiency by calculating a context index with reference to a neighboring difference coefficient that is appropriate in terms of a correlation.

A picture coding device according to one embodiment of the present invention is a picture coding device that partitions difference information between a picture serving as a coding target and a picture serving as a prediction target into a plurality of sub blocks, and codes the partitioned sub block in a certain order, the picture coding device includes: a significant sub block information encoder (706, 708, 701) that codes significant sub block information indicating whether or not all values of difference coefficients belonging to the sub block are zero; a significant difference coefficient information encoder (706, 708) that codes significant difference coefficient information indicating whether or not the value of the difference coefficient is zero; a difference coefficient value encoder (707, 701) that codes the value of the difference coefficient; and a context deriver (707, 701) that derives a context for coding the significant difference coefficient information of the sub block serving as the coding target based on at least one of the significant sub block information, the significant difference coefficient information, and the value of the difference coefficient of the coded sub block neighboring the sub block serving as the coding target.

Another embodiment of the present invention provides a picture coding method. This method is a picture coding method of partitioning difference information between a picture serving as a coding target and a picture serving as a prediction target into a plurality of sub blocks, and codes the partitioned sub block in a certain order, and includes: coding significant sub block information indicating whether or not all values of difference coefficients belonging to the sub block are zero; coding significant difference coefficient information indicating whether or not the value of the difference coefficient is zero; coding the value of the difference coefficient; and deriving a context for coding the significant difference coefficient information of the sub block serving as the coding target based on at least one of the significant sub block information, the significant difference coefficient information, and the value of the difference coefficient of the coded sub block neighboring the sub block serving as the coding target.

Further, another embodiment of the present invention provides a transmitting device. This device includes: a packet processor that packetizes a bitstream coded by a picture coding method of partitioning difference information between a picture serving as a coding target and a picture serving as a prediction target into a plurality of sub blocks, and codes the partitioned sub block in a certain order, and obtain coding data; and a transmitter that transmits the packetized coding data. The picture coding method includes: coding significant sub block information indicating whether or not all values of difference coefficients belonging to the sub block are zero; coding significant difference coefficient information indicating whether or not the value of the difference coefficient is zero; coding the value of the difference coefficient; and deriving a context for coding the significant difference coefficient information of the sub block serving as the coding target based on at least one of the significant sub block information, the significant difference coefficient information, and the value of the difference coefficient of the coded sub block neighboring the sub block serving as the coding target.

Further, another embodiment of the present invention provides a transmission method. This method includes: packetizing a bitstream coded by a picture coding method of partitioning difference information between a picture serving as a coding target and a picture serving as a prediction target into a plurality of sub blocks, and codes the partitioned sub block in a certain order, and obtaining coding data; and transmitting the packetized coding data. The picture coding method includes: coding significant sub block information indicating whether or not all values of difference coefficients belonging to the sub block are zero; coding significant difference coefficient information indicating whether or not the value of the difference coefficient is zero; coding the value of the difference coefficient; and deriving a context for coding the significant difference coefficient information of the sub block serving as the coding target based on at least one of the significant sub block information, the significant difference coefficient information, and the value of the difference coefficient of the coded sub block neighboring the sub block serving as the coding target.

A picture decoding device according an embodiment of the present invention is a picture decoding device that decodes a bitstream obtained by partitioning difference information between a picture serving as a decoding target and a picture serving as a prediction target into a plurality of sub blocks and coding the partitioned sub block in a certain order, and includes: a significant sub block information decoder (1006, 1008, 1001) that decodes significant sub block information indicating whether or not all values of difference coefficients belonging to the sub block are zero; a significant difference coefficient information decoder (1006, 1008) that decodes significant difference coefficient information indicating whether or not the value of the difference coefficient is zero; a difference coefficient value decoder (1007, 1001) that decodes the value of the difference coefficient; and a context deriver (1007, 1001) that derives a context for decoding the significant difference coefficient information of the sub block serving as the decoding target based on at least one of the significant sub block information, the significant difference coefficient information, and the value of the difference coefficient of the decoded sub block neighboring the sub block serving as the decoding target.

Another embodiment of the present invention provides a picture decoding method. This method is a picture decoding method that decodes a bitstream obtained by partitioning difference information between a picture serving as a decoding target and a picture serving as a prediction target into a plurality of sub blocks and coding the partitioned sub block in a certain order, and includes: decoding significant sub block information indicating whether or not all values of difference coefficients belonging to the sub block are zero; decoding significant difference coefficient information indicating whether or not the value of the difference coefficient is zero; decoding the value of the difference coefficient; and deriving a context for decoding the significant difference coefficient information of the subblock serving as the decoding target based on at least one of the significant sub block information, the significant difference coefficient information, and the value of the difference coefficient of the decoded sub block neighboring the sub block serving as the decoding target.

Further, another embodiment of the present invention provides a receiving device. This device is a receiving device that receives a bitstream obtained by coding a moving picture and decodes the received bitstream, and includes: a receiver that receives coding data obtained by packetizing a bitstream obtained by partitioning difference information between a picture serving as a decoding target and a picture serving as a prediction target into a plurality of sub blocks and coding the partitioned sub block in a certain order; a reconstructor that performs packet processing on the received packetized coding data to reconstruct the bitstream; a significant sub block information decoder (1006, 1008, 1001) that decodes significant sub block information indicating whether or not all values of difference coefficients belonging to the sub block are zero from the reconstructed bitstream; a significant difference coefficient information decoder (1006, 1008) that decodes significant difference coefficient information indicating whether or not the value of the difference coefficient is zero from the reconstructed bitstream; a difference coefficient value decoder (1007, 1001) that decodes the value of the difference coefficient from the reconstructed bitstream; and a context deriver (1007, 1001) that derives a context for decoding the significant difference coefficient information of the sub block serving as the decoding target based on at least one of the significant sub block information, the significant difference coefficient information, and the value of the difference coefficient of the decoded sub block neighboring the sub block serving as the decoding target.

Further, another embodiment of the present invention provides a reception method. This method is a reception method of receiving a bitstream obtained by coding a moving picture and decoding the received bitstream, and includes: receiving coding data obtained by packetizing a bitstream obtained by partitioning difference information between a picture serving as a decoding target and a picture serving as a prediction target into a plurality of sub blocks and coding the partitioned sub block in a certain order; performing packet processing on the received packetized coding data to reconstruct the bitstream; decoding significant sub block information indicating whether or not all values of difference coefficients belonging to the sub block are zero from the reconstructed bitstream; decoding significant difference coefficient information indicating whether or not the value of the difference coefficient is zero from the reconstructed bitstream; decoding the value of the difference coefficient from the reconstructed bitstream, and deriving a context for decoding the significant difference coefficient information of the subblock serving as the decoding target based on at least one of the significant sub block information, the significant difference coefficient information, and the value of the difference coefficient of the decoded sub block neighboring the sub block serving as the decoding target.

Further, an embodiment obtained by exchanging an arbitrary combination of the above components and an expression of the present invention among a method, a device, a system, a recording medium, a computer program, and the like is also effective as an aspect of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

A technique as the premise of an embodiment of the present invention will be first described.

A technique of associating each coding syntax with a plurality of contexts and selecting a context based on a correlation of a syntax element can optimize code allocation and thus can be efficient coding.

Figure 12:
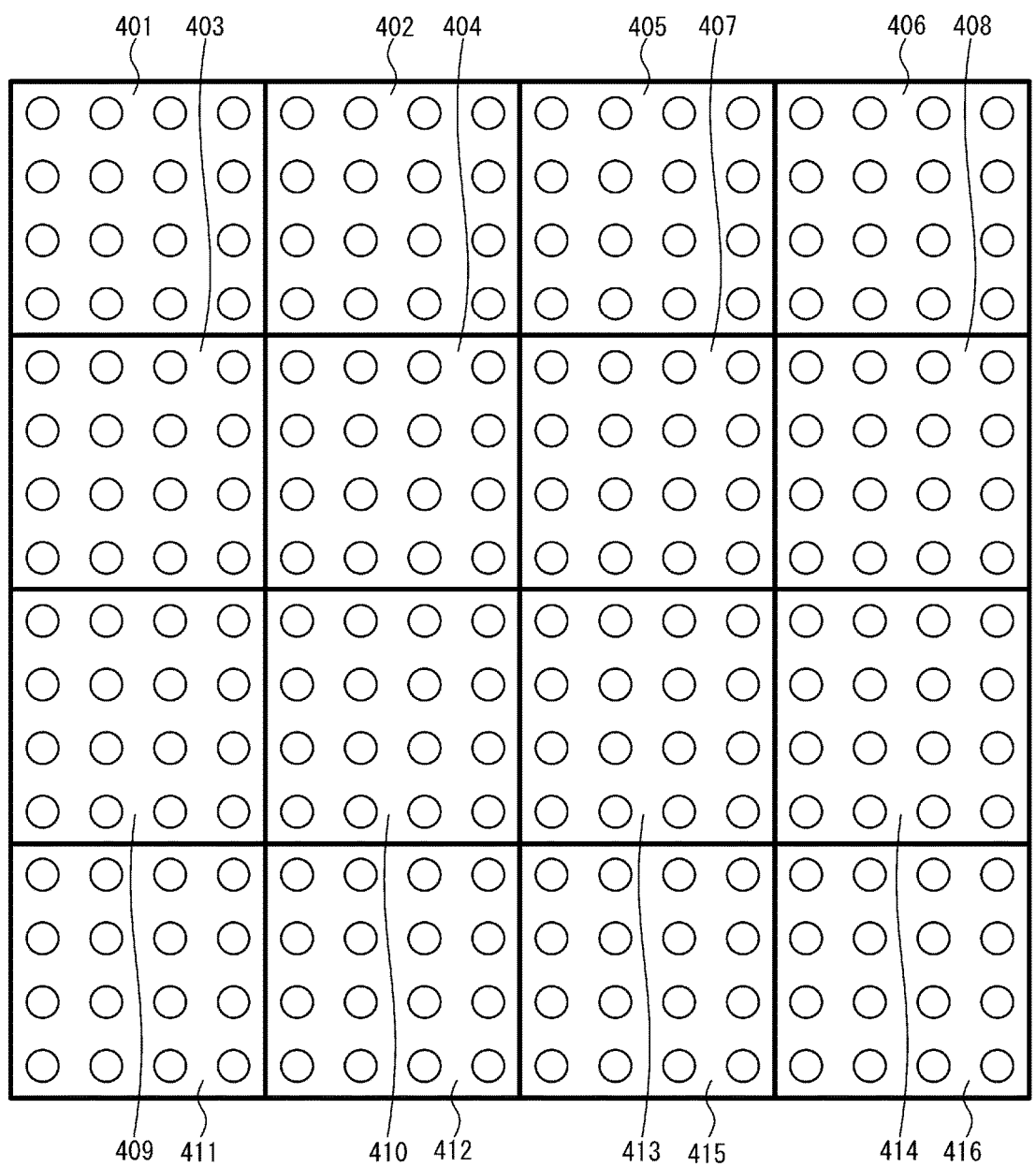
FIG. 12 is a diagram for describing sub block partitioning of a difference coefficient.

As exemplary context adaptive entropy coding, a process of decoding a quantization orthogonal transform coefficient of a difference signal to be coded in a 16×16 size will be described with reference to a flowchart of FIG. 1. FIG. 12 illustrates a quantization orthogonal transform coefficient of a processing target. Hereinafter, a quantization orthogonal transform coefficient is referred to as a "difference coefficient." In the present process, a 16×16 difference coefficient of a processing target is partitioned into sub blocks 401 to 416 of a 4×4 size, and scanning is preferentially performed in units of sub blocks.

Figure 7:
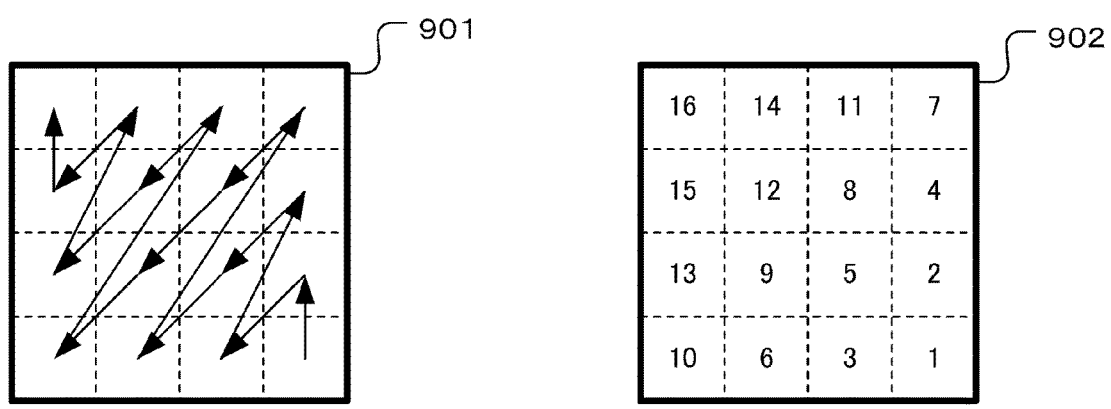
FIG. 7 is a diagram for describing a scan order of difference coefficients of a sub block.

A sub block of a processing target is decided according to a scan order that will be described later (S101). When scanning of all sub blocks ends, a difference coefficient decoding process ends. A reference numeral 902 in FIG. 7 indicates a sub block scan order. In the present process, scanning starts from a lower rightmost sub block in a difference coefficient region, is performed according to a rule in which it proceeds from the under right to the upper left and then from the under right to the upper left, and ends at a upper leftmost sub block. A reference numeral 901 in FIG. 7 is a diagram illustrating a sub block scan order using arrows. When scanning is performed according to the scan order of FIG. 7, it becomes a state in which scanning of sub blocks positioned at spatially right and lower sides among all processing target sub blocks is completed.

Figure 1:
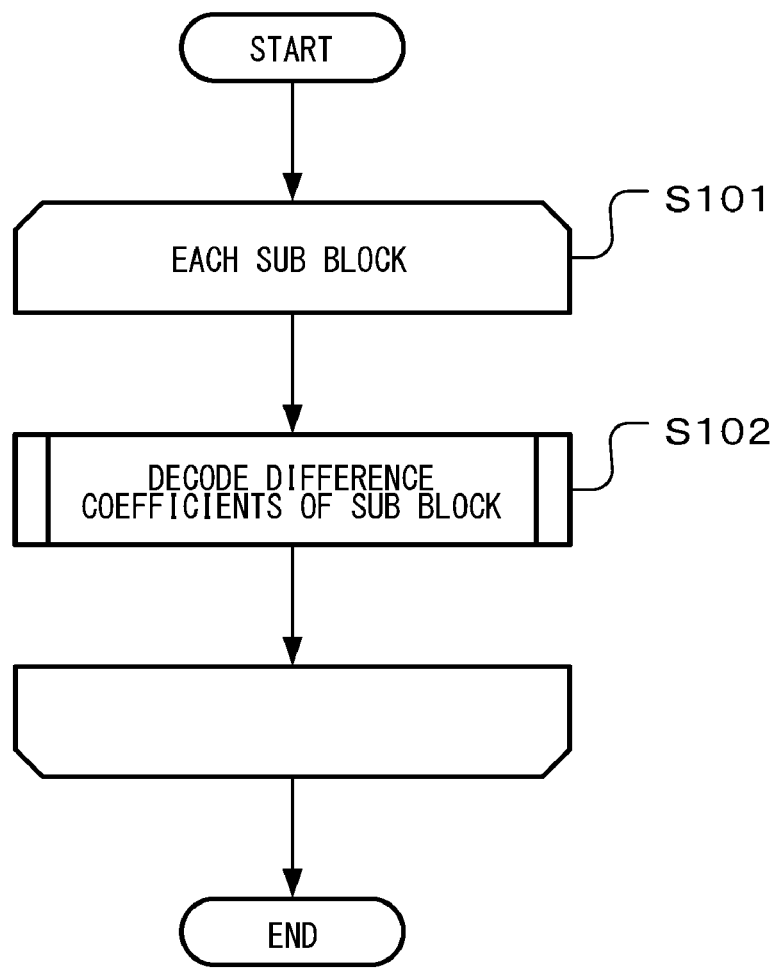
FIG. 1 is a flowchart for describing a difference coefficient decoding process according to a related art.

Referring back to the flowchart of FIG. 1, a process of decoding all difference coefficient values of the processing target sub block is performed (S102). After the sub block difference coefficient values are decoded, the process proceeds to step S101.

Figure 2:
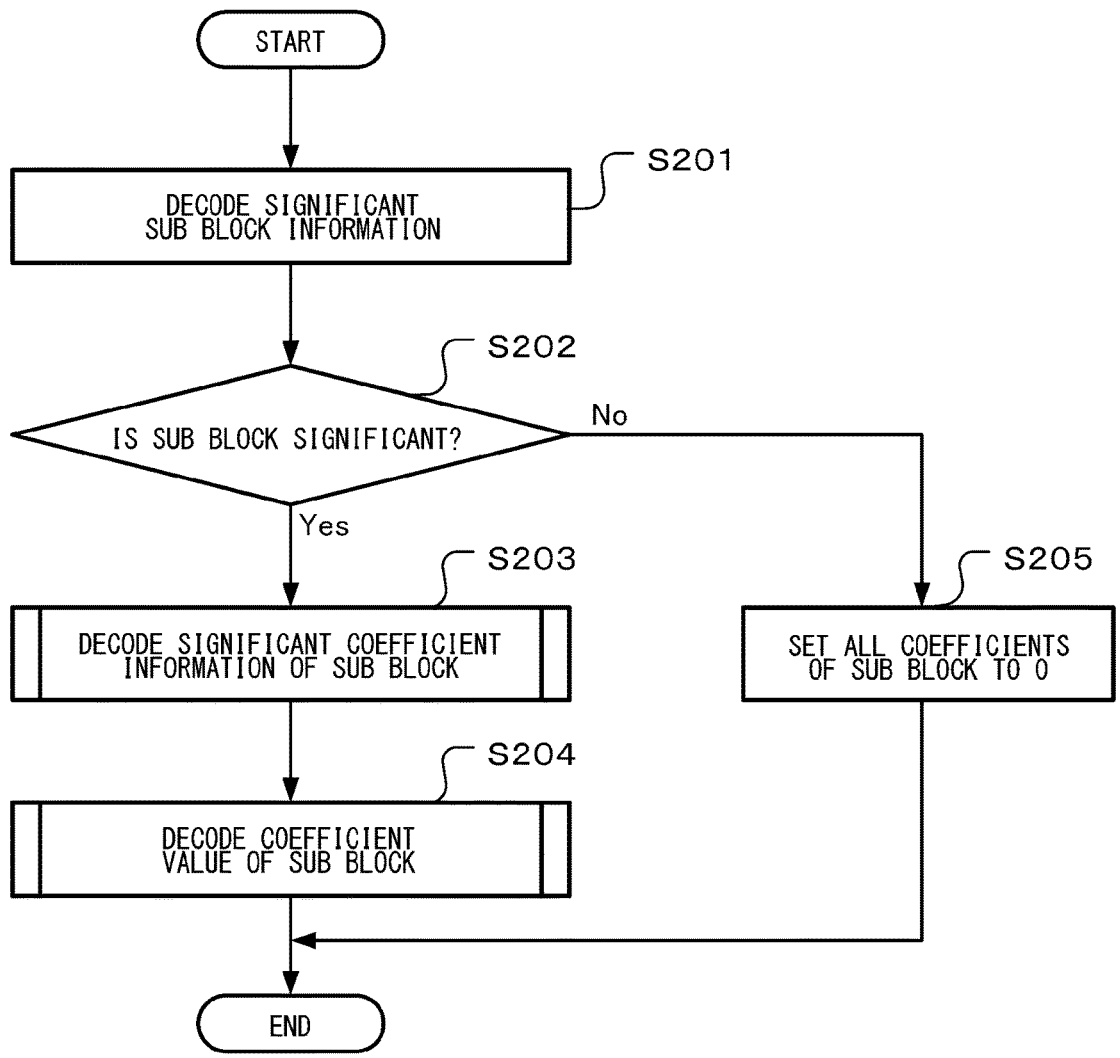
FIG. 2 is a flowchart for describing a sub block difference coefficient decoding process according to a related art.

The details of the sub block difference coefficient value decoding process will be described with reference to the flowchart of FIG. 2.

Significant sub block information is decoded (S201). The significant sub block information is a 1-bit flag indicating that there is a non-zero difference coefficient in the processing target sub block. The significant sub block information of 1 indicates that there is at least one non-zero difference coefficient in the processing target sub block. The significant sub block information of 0 indicates that all difference coefficients of the processing target sub block are 0.

A value of the significant sub block information is determined (S202). When the significant sub block information is 0, all the difference coefficient values of the processing target sub block are set to 0 (S209), and then the sub block difference coefficient value decoding process ends.

When the significant sub block information is 1, a process of decoding all significant difference coefficient information of the processing target sub block is performed (S203). The significant difference coefficient information is a 1-bit flag indicating that a difference coefficient value at a processing target position is not 0. The significant coefficient information of 1 indicates that a difference coefficient value at a processing target position is not 0, and the significant coefficient information of 0 indicates that a difference coefficient value at a processing target position is 0. The details of the process of decoding the significant difference coefficient information of the sub block will be described later. After all significant difference coefficient information of the sub block is decoded, the process proceeds to decoding of a difference coefficient value of step S204.

A difference coefficient value decoding process is performed (S204). The details of the difference coefficient value decoding process will be described later. The difference coefficient value decoding process is completed, the process proceeds to step S101, and scanning of a next sub block is performed.

[Significant Difference Coefficient Information Decoding Process]

The process of decoding the significant difference coefficient information of the sub block in step S203 will be described with reference to a flowchart of FIG. 3.

A processing target sub block is decided according to a certain scan order (S301). The scan order of difference coefficients in a sub block is assumed to follow the rule illustrated in FIG. 7, similarly to the sub block scan order in the difference coefficient region.

Figure 9:
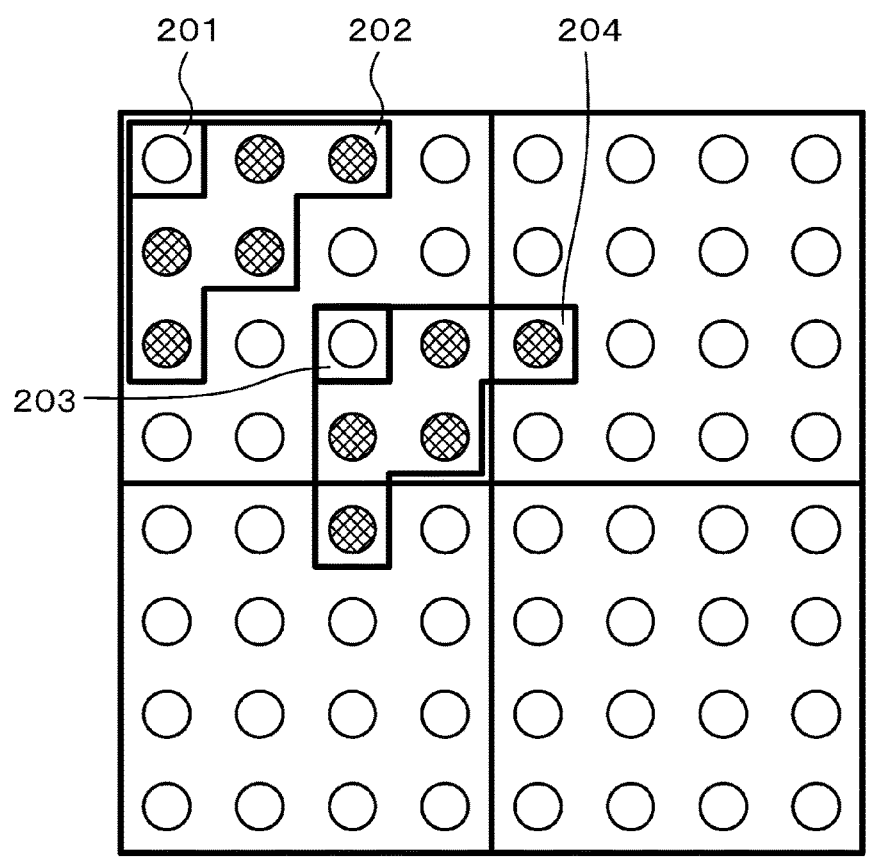
FIG. 9 is a diagram for describing a definition of a neighboring difference coefficient in the significant difference coefficient decoding process of FIG. 3.

A neighboring significant difference coefficient sum countCoeff that is a sum of the number of non-zero difference coefficients that neighbor a processing target difference coefficient position and are decoded is calculated (S302). FIG. 9 illustrates an exemplary difference coefficient position for calculating the neighboring significant difference coefficient sum countCoeff. A reference numeral 202 indicates neighboring difference coefficients when a processing target position is a reference numeral 201, and a reference numeral 204 indicates neighboring difference coefficients when a processing target position is a reference numeral 203. As illustrated in FIG. 9, five difference coefficients that are positioned at the right and lower sides of the processing target difference coefficient position and neighboring the processing target difference coefficient position are assumed to be neighboring difference coefficients. Since the scan order of the difference coefficients follows the rule of FIG. 7, difference coefficients that belong to the same sub block as the processing target difference coefficient and are positioned at the right and lower sides of the processing target difference coefficient position are decoded coefficients. Similarly, significant difference coefficients belonging to sub blocks at the right and lower sides of the sub block positioned at the processing target position are decoded coefficients. The neighboring difference coefficient sum countCoeff is a variable for estimating a probability of occurrence of a significant difference coefficient. Due to characteristics and visual characteristics of a picture, significant difference coefficients are likely to be concentrated on "1" at a low frequency range and "0" at a high frequency range. Since a significant difference coefficient has a spatial correlation, a difference coefficient neighboring the processing target position is set as a calculation target for the neighboring difference coefficient sum countCoeff. Neighboring difference coefficients indicating the outside of the difference coefficient region are excluded from a calculation for the neighboring significant coefficient sum countCoeff.

Figure 3:
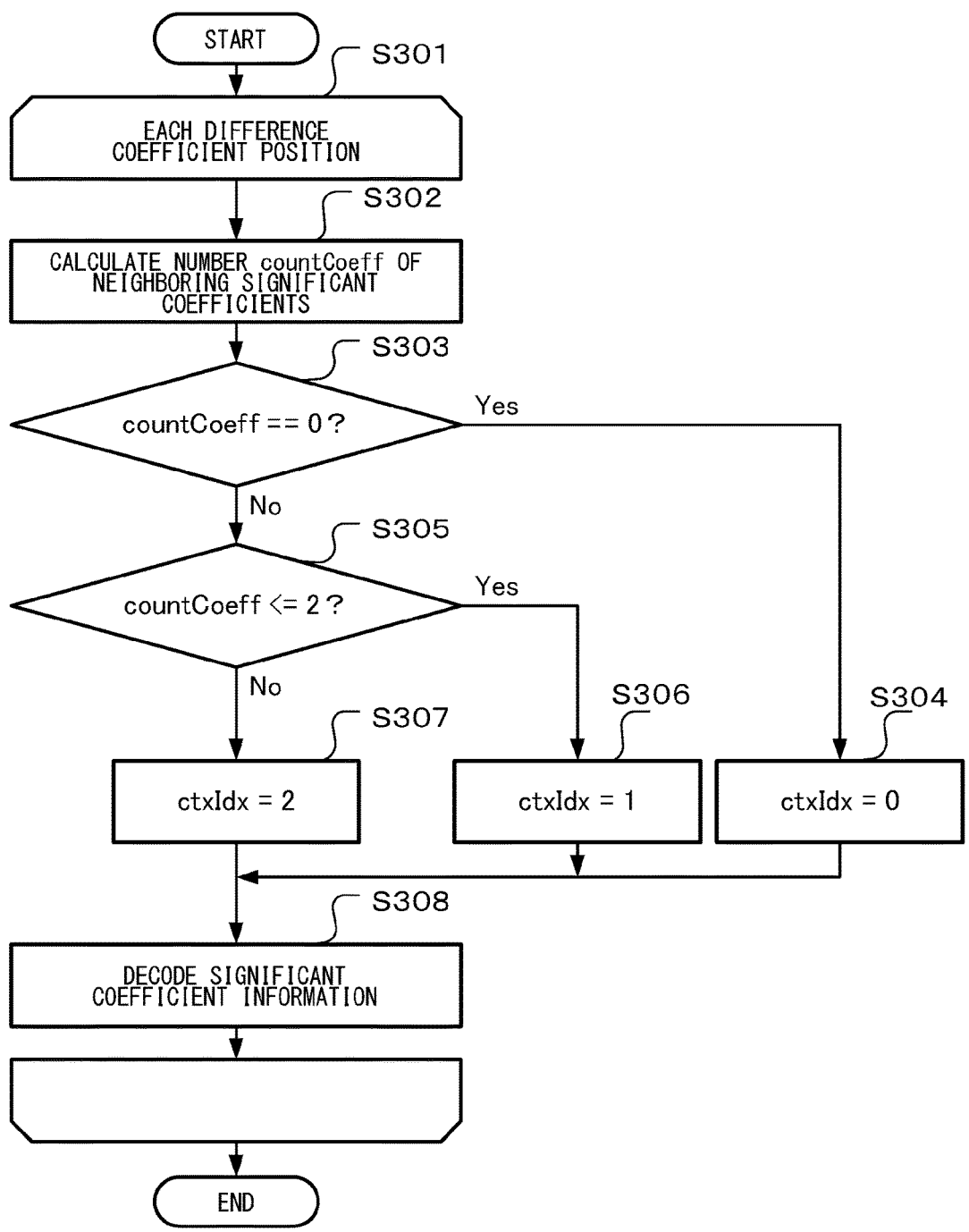
FIG. 3 is a flowchart for describing a significant difference coefficient decoding process according to a related art.
Figure 4:
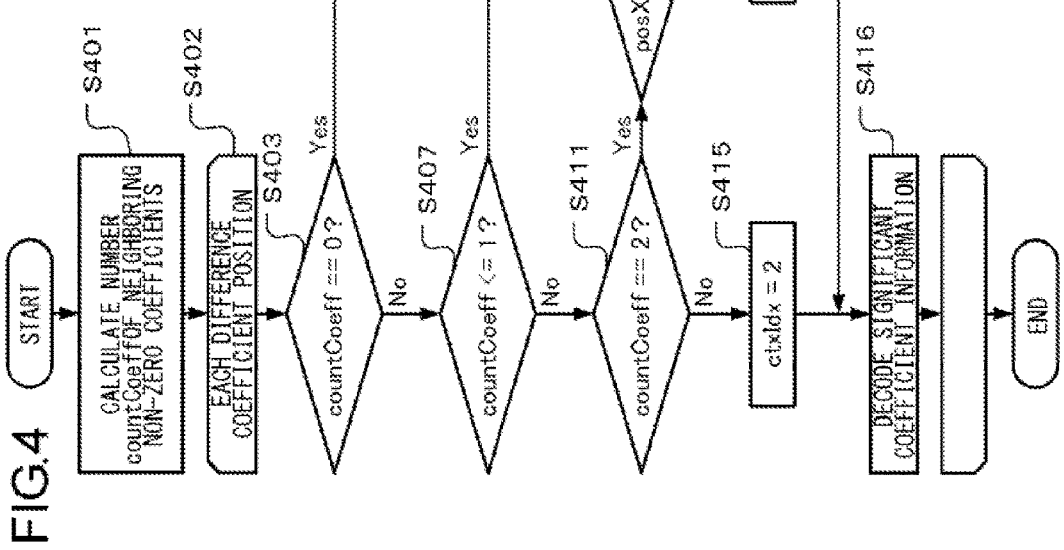
FIG. 4 is a flowchart for describing a difference coefficient value decoding process according to a first embodiment.

Referring back to the flowchart of FIG. 3, it is determined whether or not the neighboring significant coefficient sum countCoeff is 0 (S303). When the neighboring significant coefficient sum countCoeff is 0, a context index ctxIdx for decoding the significant difference coefficient information is set to 0 (S304), and the significant difference coefficient information is decoded using a context corresponding to the context index ctxIdx. Then, the significant difference coefficient information is set as the difference coefficient value (S308).

When the neighboring significant coefficient sum count-Coeff is not 0, determines whether or not the neighboring significant coefficient sum countCoeff is smaller than or equal to 2 (S305). When the neighboring significant coefficient sum countCoeff is smaller than or equal to 2, the context index ctxIdx for decoding the significant difference coefficient information is set to 1 (S306), and the significant difference coefficient information is decoded using the context corresponding to the context index ctxIdx. Then, the significant difference coefficient information is set as the difference coefficient value (S308).

When the neighboring significant coefficient sum count-Coeff is neither smaller than nor equal to 2, that is, when the neighboring significant coefficient sum countCoeff is larger than or equal to 3, the context index ctxIdx for decoding the significant difference coefficient information is set to 2 (S307), and the significant difference coefficient information is decoded using the context corresponding to the context index ctxIdx. Then, the significant difference coefficient information is set as the difference coefficient value (S308).

A context is a variable for storing a probability of occurrence of information to be decoded, and allocation of a code word is switched based on a probability of occurrence indicated by a context. In the above example, three contexts for coding a significant difference coefficient are defined, and a context for decoding a significant difference coefficient is decided based on the magnitude of the neighboring significant difference coefficient sum. In advance, a high probability of occurrence of the significant coefficient information of 0 is set to a context corresponding to the context index ctxIdx (=0) when the neighboring significant coefficient sum countCoeff is 0, and a high probability of occurrence of the significant coefficient information of 1 is set to a context corresponding to the context index ctxIdx (=2) when the neighboring significant coefficient sum countCoeff is larger than or equal to 3. Since it is possible to reduce a coding amount for information having a high probability of occurrence, the coding efficiency can be improved by increasing the estimation accuracy of the probability of occurrence.

In MPEG-4 AVC, learning of a probability of occurrence based on a decoding result is performed in addition to estimation of a probability of occurrence of information by switching of a context based on decoded neighboring information. It is possible to optimize a probability of occurrence of information to be decoded for each context, and thus the coding efficiency is improved.

Commonly, information of an orthogonal transform component of a picture is likely to be concentrated at a low frequency range. Further, since visual characteristics have little influence on degradation of a high frequency component, coarse quantization of a high frequency component is often practically performed. Thus, the significant coefficient information tends to be concentrated on the low frequency component. The significant coefficient information has a high correlation with the neighboring significant coefficient, it is logical in terms of coding efficiency to switch a context based on the number of neighboring significant coefficient information.

[Difference Coefficient Value Decoding Process]

Figure 13:
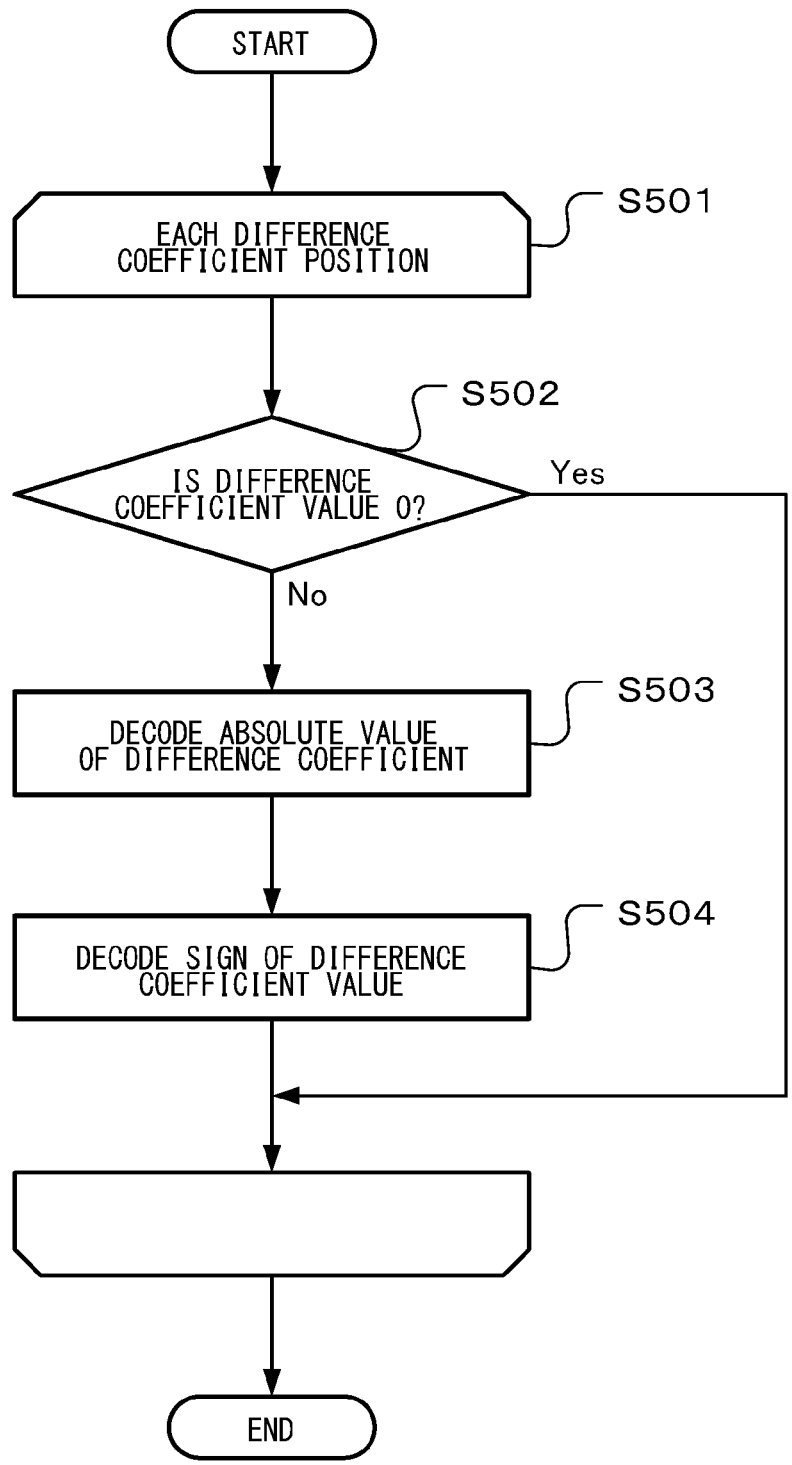
FIG. 13 is a flowchart for describing a difference coefficient value decoding process according to the first embodiment.

The process of decoding difference coefficient values of a sub block in step S204 in the flowchart of FIG. 2 will be described with reference to a flowchart of FIG. 13.

A processing target sub block is decided according to a certain scan order (S501). The scan order of difference coefficients in the sub block is assumed to follow the rule illustrated in FIG. 7, similarly to the scan order of the significant difference coefficient information. When scanning of all the difference coefficients of the sub block ends, the process of decoding the difference coefficient value is completed, and the process proceeds to a process of deciding a next sub block (S101).

It is determined whether or not the difference coefficient value at the processing target difference coefficient position is 0 (S502). When the difference coefficient value at the processing target difference coefficient position is 0, decoding of the difference coefficient value at the processing target difference coefficient position is completed, and the process proceeds to step S501.

When the difference coefficient value at the processing target difference coefficient position is 1, the absolute value of the difference coefficient at the processing target difference coefficient position is decoded (S503). When the present process is performed, the difference coefficient value is decided to be not 0, code words according to values obtained by subtracting 1 from the absolute values of the difference coefficients are coded. Thus, a value obtained by adding 1 to a value obtained by entropy-decoding a code word is set as the absolute value of the difference coefficient.

A sign of the difference coefficient at the processing target difference coefficient position is decoded (S504). The difference coefficient value is decided based on the absolute value of the difference coefficient and the sign of the difference coefficient.

In the significant difference coefficient information decoding process, 201 in FIG. 9 is scanned lastly in the sub block as indicated by the scan order of 902 in FIG. 7, and its scan order is 16 as indicated in 902 in FIG. 7. Further, among difference coefficients 202 neighboring 201, the scan order of a position neighboring below 201 is 15, and it is scanned directly before 201. Since the context index ctxIdx necessary for decoding the significant difference coefficient information of 201 is decoded based on the sum of the significant difference coefficients of 202, it is difficult to decide the context index ctxIdx of 201 until the decoding of the significant difference coefficient information of 202 is completed. It means that it is necessary to sequentially process a calculation of ctxIdx and decoding the significant difference coefficient information for all significant difference coefficient information in the sub block, and thus it is difficult to reduce time complexity by parallelization. Meanwhile, an occupancy ratio of the difference coefficient on a bitstream is high, and the context index calculation process and the decoding process of the significant difference coefficient information are large in their occupied time complexity in the entire decoding process. In other words, the decoding process of the significant coefficient information hits a maximum bottleneck in the real-time decoding process.

Patent Literature 1 discloses a technique of arranging a context for a syntax element having a high frequency of occurrence on a memory having small access latency and reducing a processing delay related to decoding. However, the technique disclosed in Patent Literature 1 does not solve dependence on calculation of a context index and decoding a syntax element and is not an essential solution to a processing delay since it is difficult to perform the calculation and the decoding in parallel.

In this regard, according to an embodiment of the present invention, provided are picture coding and decoding techniques that are capable of eliminating dependence between a calculation of a context index and coding/decoding of significant difference coefficient information, performing parallel processing and implementing a context index calculating method having a small computation amount in difference coefficient coding/decoding and that are simple in a circuit configuration and suitable for real-time processing. Further, provided are picture coding and decoding techniques capable of implementing high coding efficiency by calculating a context index with reference to a neighboring difference coefficient that is appropriate in terms of a correlation. Hereinafter, an embodiment of the present invention will be described.

In the following description, a "processing target block" refers to a coding target block in the case of a coding process performed by a picture coding device, and refers to a decoding target block in the case of a decoding process performed by a picture decoding device. A "processed block" refers to a coded block in the case of a coding process performed by a picture coding device, and refers to a decoded block in the case of a decoding process performed by a picture decoding device. Hereinafter, these meanings are used unless otherwise described.

[Coding Device]

Figure 5:
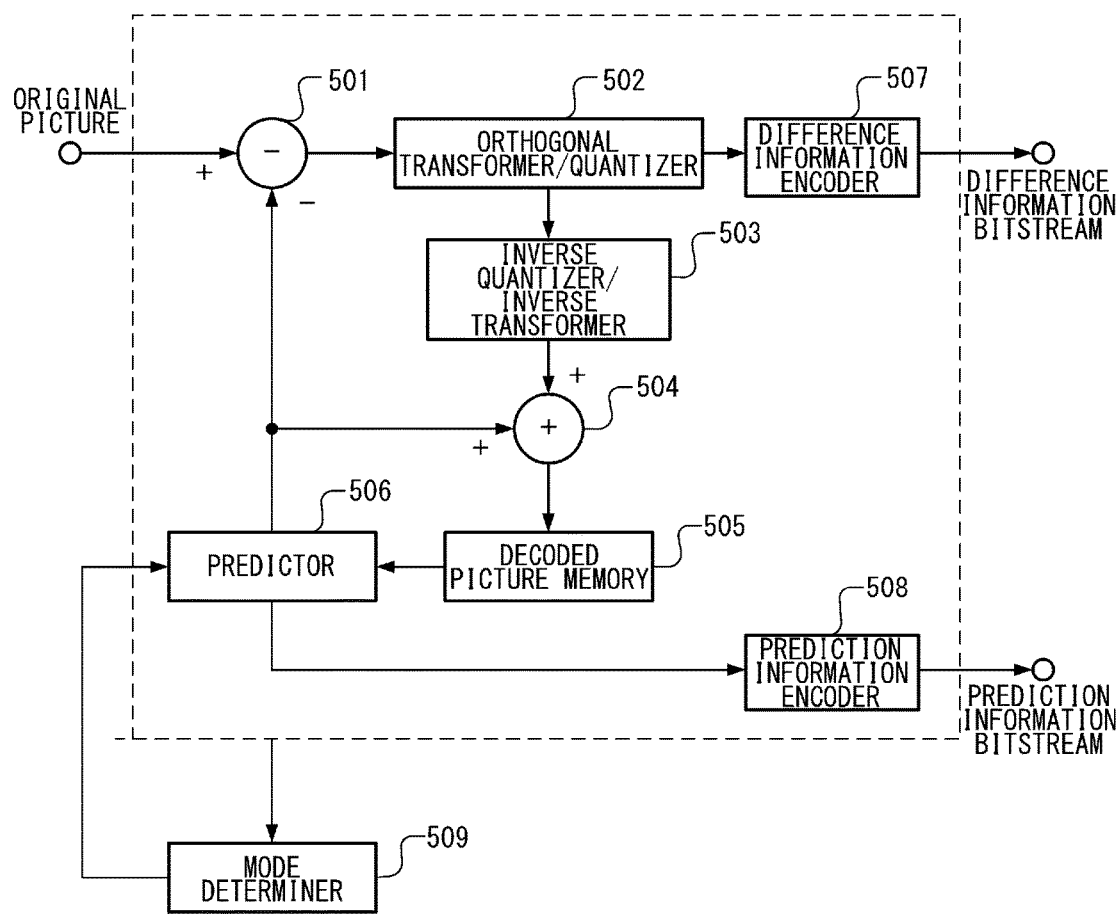
FIG. 5 is a block diagram illustrating a configuration of a picture coding device that performs a difference coefficient coding method according to an embodiment.

An exemplary picture coding device according to the present invention will be described with reference to the appended drawings. FIG. 5 is a block diagram illustrating a configuration of a picture coding device according to an embodiment. The picture coding device according to the embodiment includes a subtractor 501, an orthogonal transformer/quantizer 502, an inverse quantizer/inverse transformer 503, an adder 504, a decoded picture memory 505, a predictor 506, a difference information encoder 507, a prediction information encoder 508, and a mode determiner 509.

The mode determiner 509 tries to code all prediction candidate, and decides optimal prediction information for each block of pictures. The prediction information includes a partition block size, a prediction mode indicating inter prediction/intra prediction are included, motion information such as a motion vector and a reference picture index when the prediction mode is the inter prediction, and an intra prediction mode when the prediction mode is the intra prediction. The decided prediction information is supplied to the predictor 506 and the prediction information encoder 508.

The prediction information encoder 508 performs variable length coding on the input prediction information, and outputs a bitstream of the prediction information.

The predictor 506 constructs a prediction picture using the input prediction information and a decoded picture stored in the decoded picture memory 505, and supplies the constructed prediction picture to the subtractor 501.

The subtractor 501 constructs a difference picture by subtracting the prediction picture from the original picture of the coding target, and supplies the constructed difference signal to the orthogonal transformer/quantizer 502.

The orthogonal transformer/quantizer 502 performs orthogonal transform and quantization on the difference picture to construct a difference coefficient, and supplies the constructed difference coefficient to the inverse quantizer/inverse transformer 503 and the difference information encoder 507.

The difference information encoder 507 performs entropy coding on the difference coefficient, and outputs the bitstream sequence of the difference information.

The inverse quantizer/inverse transformer 503 performs inverse quantization and inverse orthogonal transform on the difference coefficient received from the orthogonal transformer/quantizer 502 to construct a decoded difference signal, and supplies the constructed decoded difference signal to the adder 504.

The adder 504 adds the prediction picture to the decoded difference signal to construct a decoded picture, and causes the constructed decoded picture to be stored in the decoded picture memory 505.

[Decoding Device]

Figure 6:
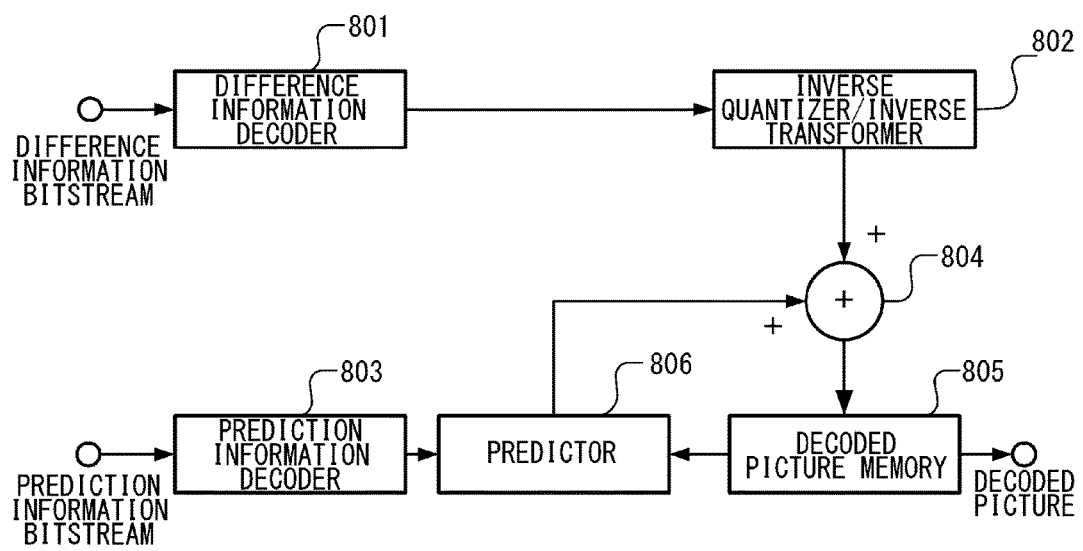
FIG. 6 is a block diagram illustrating a configuration of a picture decoding device that performs a difference coefficient decoding method according to the embodiment.

An exemplary picture decoding device according to the present invention will be described with reference to the appended drawings. FIG. 6 is a block diagram illustrating a configuration of a moving picture decoding device according to an embodiment. The picture decoding device according to the embodiment includes a difference information decoder 801, an inverse quantizer/inverse transformer 802, a prediction information decoder 803, an adder 804, a decoded picture memory 805, and a predictor 806.

Figure 8:
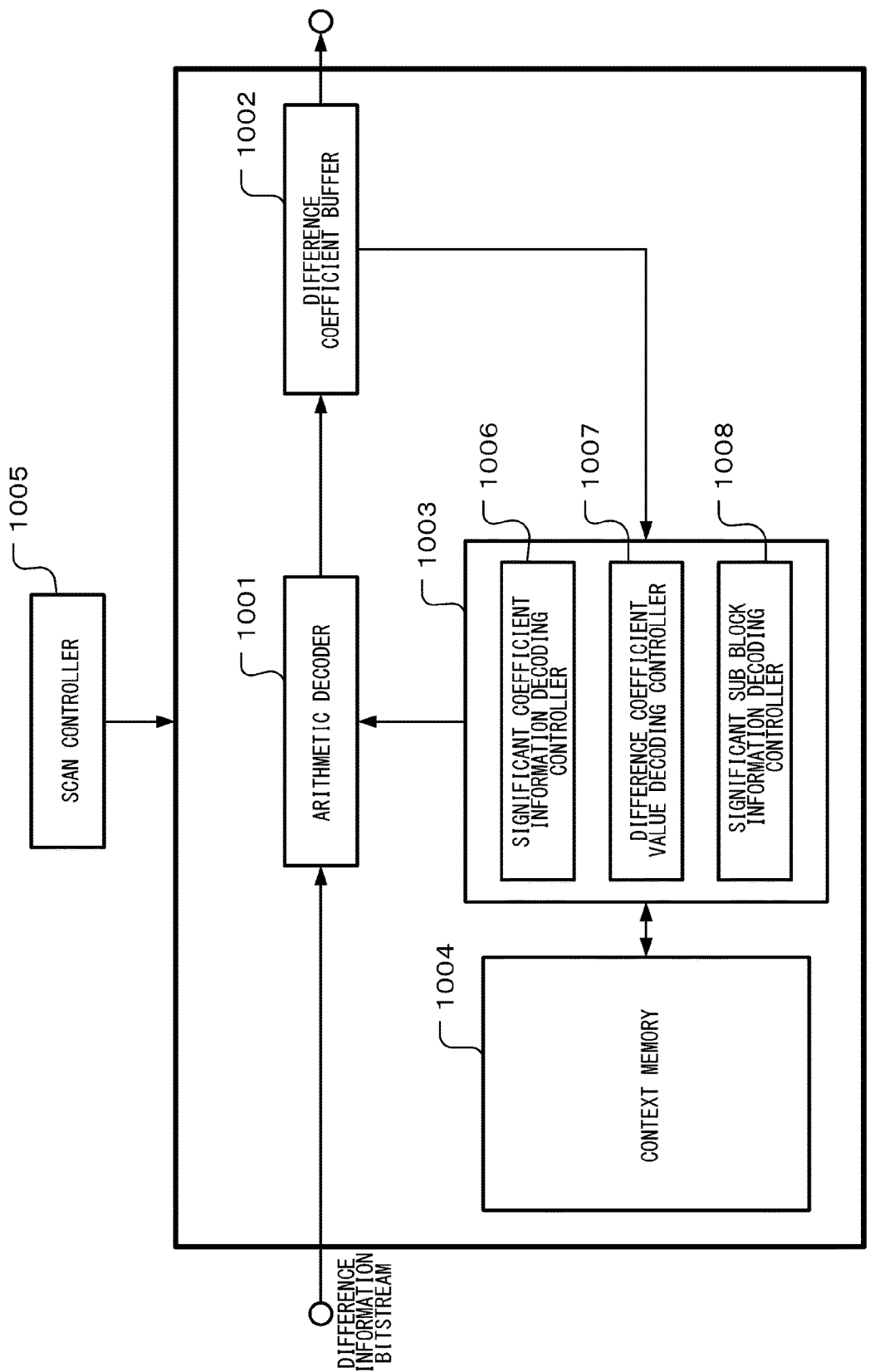
FIG. 8 is a block diagram illustrating a detailed configuration of the picture decoding device of FIG. 6 according to the first embodiment.

Since the decoding process of the picture decoding device of FIG. 6 corresponds to the decoding process provided in the picture coding device of FIG. 5, the respective components of the inverse quantizer/inverse transformer 802, the adder 804, the decoded picture memory 805, and the predictor 806 of FIG. 8 have functions corresponding to the respective components of the inverse quantizer/inverse transformer 503, the adder 504, the decoded picture memory 505, and the predictor 506 of the picture coding device of FIG. 5.

The prediction information decoder 803 performs entropy decoding on the input prediction information bitstream to construct prediction information, and supplies the constructed prediction information to the predictor 806.

The predictor 806 constructs a prediction picture using the input prediction information and a decoded picture stored in the decoded picture memory 805, and supplies the constructed prediction picture to the adder 804.

The difference information decoder 801 performs entropy decoding on the difference information to construct difference information. The constructed difference information is supplied to the inverse quantizer/inverse transformer 802.

The inverse quantizer/inverse transformer 802 performs inverse quantization and inverse orthogonal transform on the difference information received from the difference information decoder 801 to construct the decoded difference signal, and supplies the constructed decoded difference signal to the adder 804.

The adder 804 adds the prediction picture to the decoded difference signal to construct a decoded picture, and outputs the constructed decoded picture to be stored in the decoded picture memory 805.

The difference coefficient coding and decoding processes according to the embodiment of the present invention are performed in the difference information encoder 507 of the moving picture coding device of FIG. 5 and the difference information decoder 801 of the moving the picture decoding device of FIG. 8. Next, the details of the difference information coding and decoding processes according to an embodiment will be described.

[Coding Block]

Figure 14:
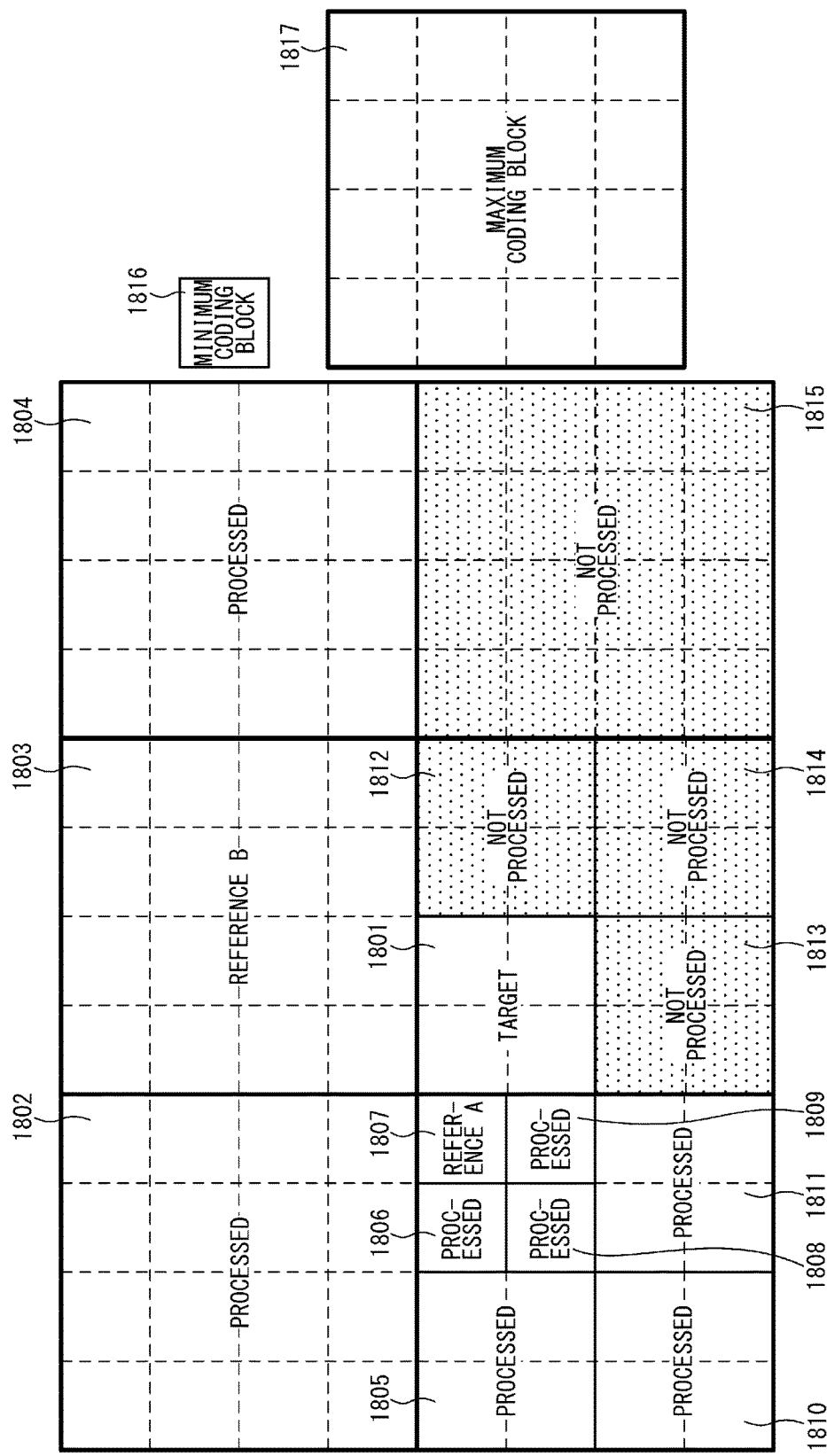
FIG. 14 is a diagram for describing a coding block size.

In the embodiment, as illustrated in FIG. 14, a screen is hierarchically partitioned into rectangular blocks, and a sequential process based on a certain processing order is performed on the respective blocks. Each partitioned block is referred to as a "coding block." A block 1817 of FIG. 14 is a maximum unit of partition in an embodiment, and referred to as a maximum coding block. A block 1816 of FIG. 14 is a minimum unit of partition in an embodiment, and referred to as a minimum coding block. Hereinafter, the minimum coding block and the maximum coding block will be described as 4×4 pixels and 16×16 pixels.

[Prediction Block]

Among coding blocks, a unit in which intra prediction is performed is referred to as a prediction block. A prediction block has a size that is larger than or equal to the minimum coding block and smaller than or equal to the maximum coding block. In FIG. 14, blocks 1802, 1803, and 1804 are 16×16 blocks, blocks 1805, 1810, 1811, and 1801 are 8×8 blocks, and blocks 1806, 1807, 1808, and 1809 are 4×4 blocks. Blocks 1812, 1813, 1814, and 1815 are non-processed blocks, and coding block sizes thereof are not decided yet. In the coding process, an optimal prediction block size is decided, and a prediction block size is coded. In the decoding process, a prediction block size is derived from a bitstream. The following description will proceed in connection with an example in which a prediction block is used as a processing unit.

[Processing Unit of Difference Coefficient]

A unit in which quantization and orthogonal transform are performed is identical to a unit of a prediction block, but in the coding/decoding process, it is assumed that a difference coefficient region is partitioned into a plurality of sub blocks, and scanning is performed. The size of a sub block is assumed to be a 4×4 size. FIG. 12 illustrates a difference coefficient region of a 16×16 size. 401 to 416 are sub blocks. Here, a unit in which quantization and orthogonal transform are performed may be decided independently of a unit of a prediction block.

First Embodiment

[Coding Process]

Figure 15:
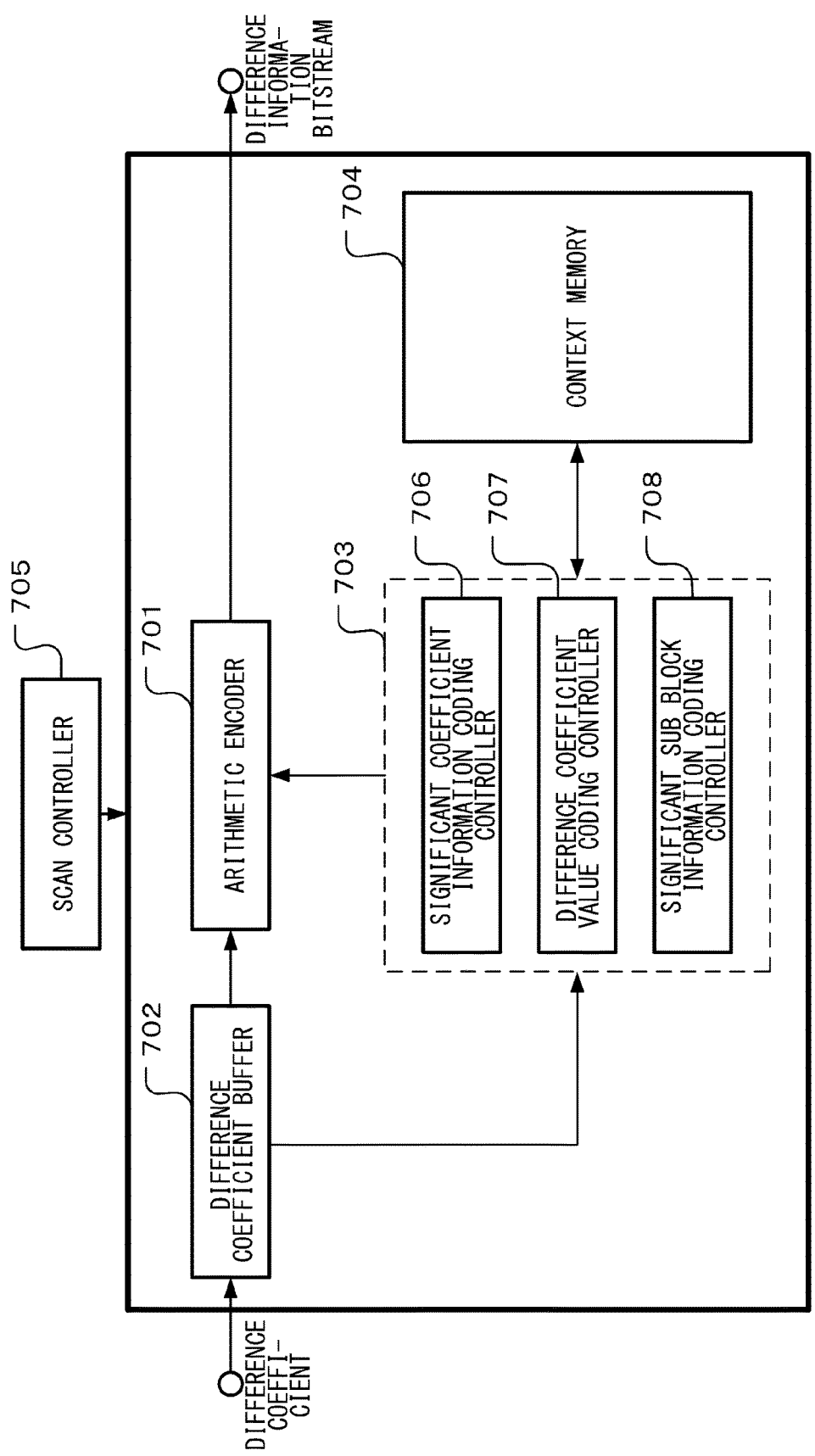
FIG. 15 is a block diagram illustrating a detailed configuration of the picture coding device of FIG. 5 according to the first embodiment.
Figure 16:
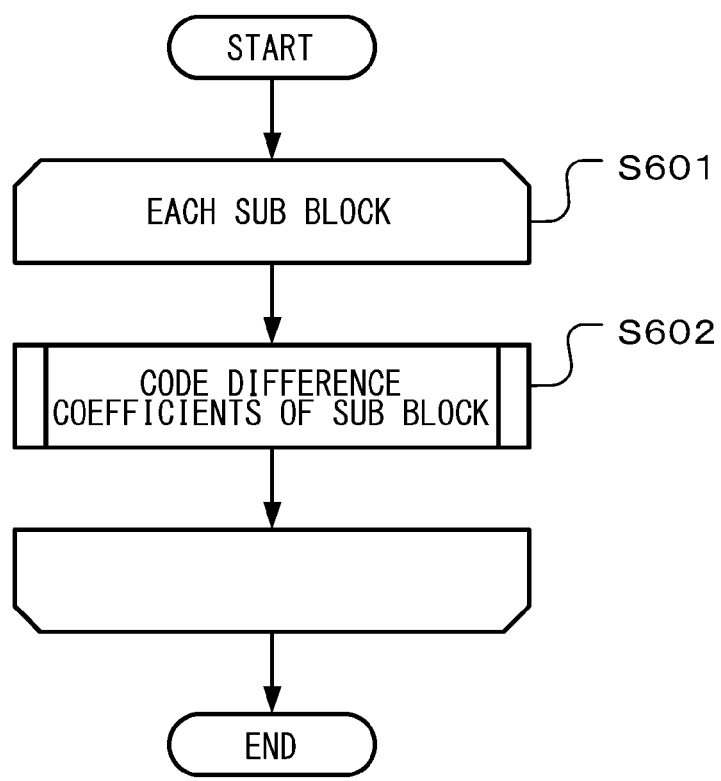
FIG. 16 is a flowchart for describing a difference coefficient coding process according to the first embodiment.
Figure 17:
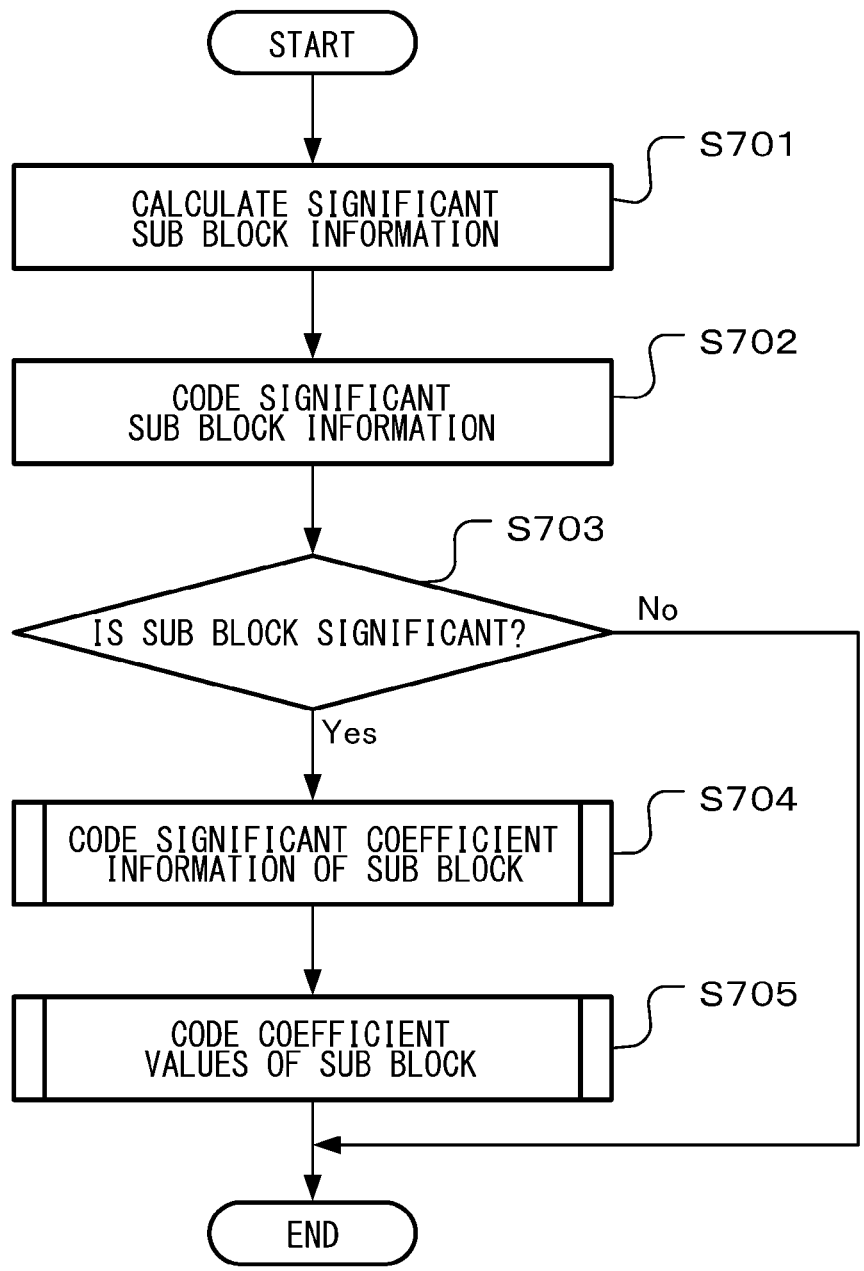
FIG. 17 is a flowchart for describing a sub block difference coefficient coding process according to the first embodiment.
Figure 18:
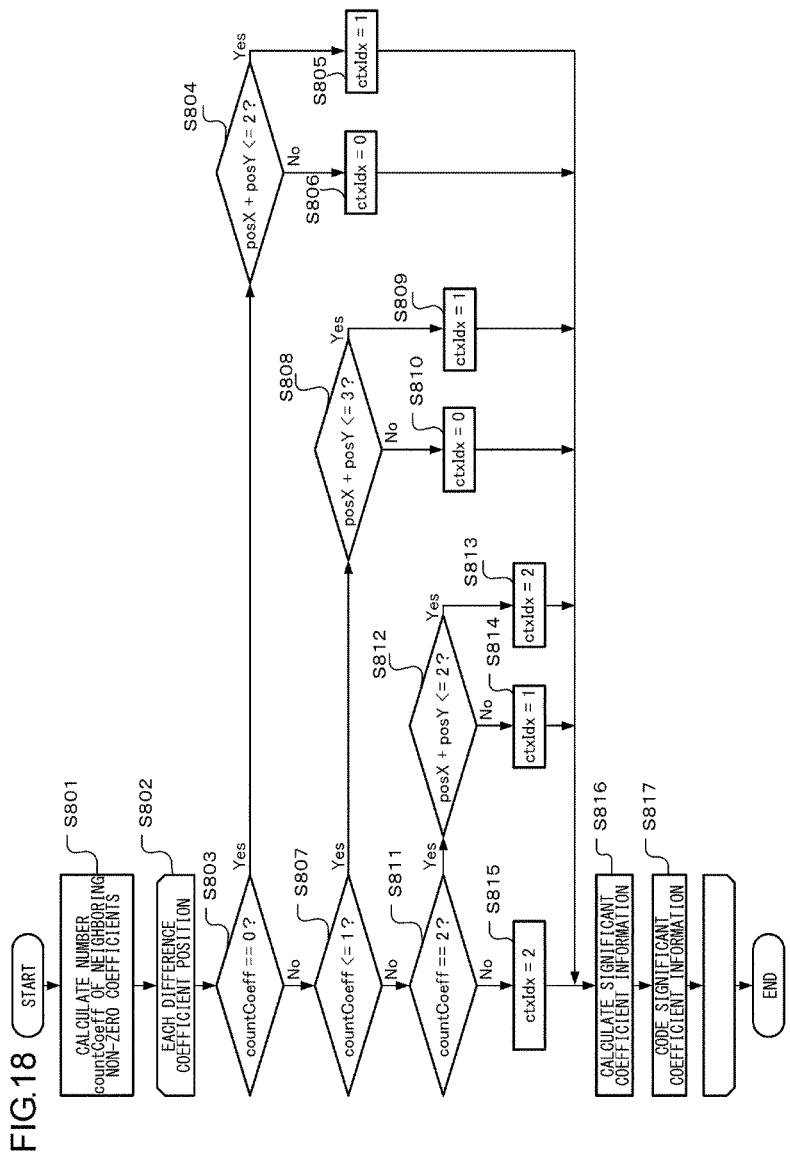
FIG. 18 is a flowchart for describing a significant difference coefficient coding process according to the first embodiment.
Figure 19:
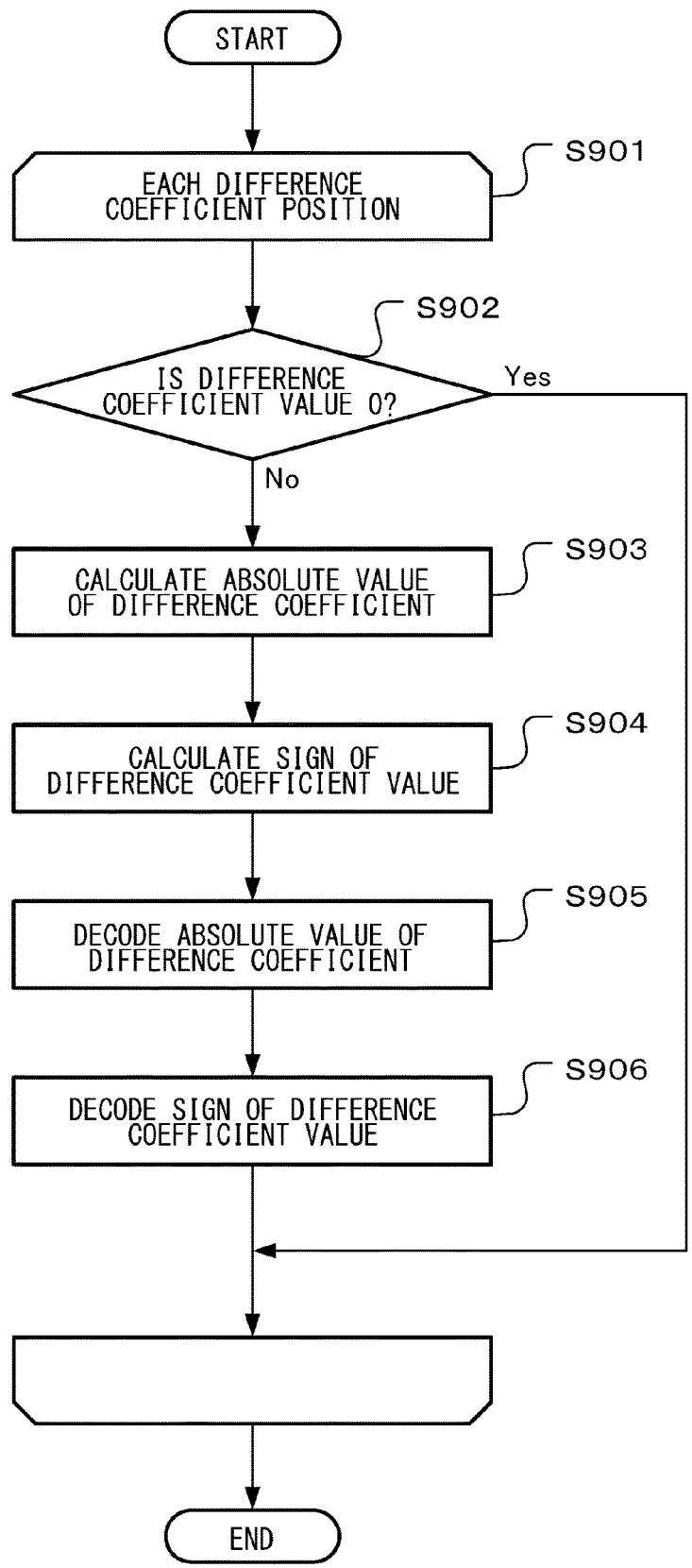
FIG. 19 is a flowchart for describing a difference coefficient value coding process according to the first embodiment.

A first embodiment of a difference information coding method according to an embodiment of the present invention will be described. FIG. 15 is a block diagram illustrating a detailed configuration of the difference information encoder 507 of FIG. 5 according to the first embodiment. The difference information encoder 507 according to the first embodiment includes an arithmetic encoder 701, a difference coefficient buffer 702, a coding controller 703, a context memory 704, and a scan controller 705, and the coding controller 703 includes a significant coefficient information coding controller 706, a difference coefficient value coding controller 707, and a significant sub block information coding controller 708.

Next, the difference coefficient coding process will be described with reference to flowcharts of FIGS. 16, 17, 18, and 19.

The scan controller 705 decides a processing target sub block (S601). When scanning of all sub blocks is completed, the difference coefficient decoding process ends. 902 in FIG. 7 indicates a sub block scan order. In the present process, scanning starts from a lower rightmost sub block in a difference coefficient region, is performed according to a rule of proceeding from the under right to the upper left and then from the under right to the upper left, and ends at a upper leftmost sub block. A context is updated through a coding process as described above. When the scan order is applied, there is a processing advantage of improving an estimation accuracy of a probability of occurrence of a difference coefficient of a frequency component by performing coding of a low frequency component in which a difference coefficient is likely to occur after coding of a high frequency component. A reference numeral 901 of FIG. 7 is a diagram illustrating a sub block scan order using arrows. When scanning is performed according to the scan order of FIG. 7, it becomes a state in which scanning of sub blocks positioned at spatially right and lower sides among processing target sub blocks is completed. A sub block coding process is performed on the processing target sub block (S602).

[Sub Block Coding Process (S602)]

The significant sub block information coding controller 708 derives a processing target sub block from the difference coefficient buffer 702. When all difference coefficients of the sub block are scanned and all the difference coefficient values are 0, the significant sub block information is set to 0. Otherwise (when there is at least one non-zero the difference coefficient value), the significant sub block information is set to 1 (S701).

The significant sub block information coding controller 708 decides the context index ctxIdx for coding the significant sub block information with reference to the difference coefficients included in a decoded sub block neighboring the processing target sub block from the difference coefficient buffer 702. The context corresponding to the context index ctxIdx is read out from the context memory 704. The significant sub block information and the context are transferred to the arithmetic encoder 701. The arithmetic encoder 701 codes the significant sub block information using the context (S702).

The significant sub block information coding controller 708 determines a value of the significant sub block information (S703). When the significant sub block information is 0, the sub block difference coefficient value coding process ends, and then the process proceeds to step S601.

When the significant sub block information is 1, a process of coding all significant difference coefficient information of the processing target sub block is performed (S704). The details of the process of coding the significant difference coefficient information will be described later. After coding of all significant difference coefficient information of the sub block ends, the process proceeds to coding of a difference coefficient value of step S704.

The difference coefficient value coding controller 707 performs a process of coding all difference coefficient values of the processing target sub block (S705). The details of the process of coding the difference coefficient value of the sub block will be described later. After coding all the difference coefficient values of the sub block ends, the process proceeds to step S601.

[Significant Difference Coefficient Information Coding Process (S704)]

The significant coefficient information coding controller 706 calculates the sum of the number of non-zero difference coefficients neighboring the processing target sub block, that is, the neighboring significant coefficient sum countCoeff (S801). In the present process, difference coefficients that belong to sub blocks positioned at spatially right and lower sides of the processing target sub block and are neighboring the processing target sub block are defined as neighboring difference coefficients.

Figure 10:
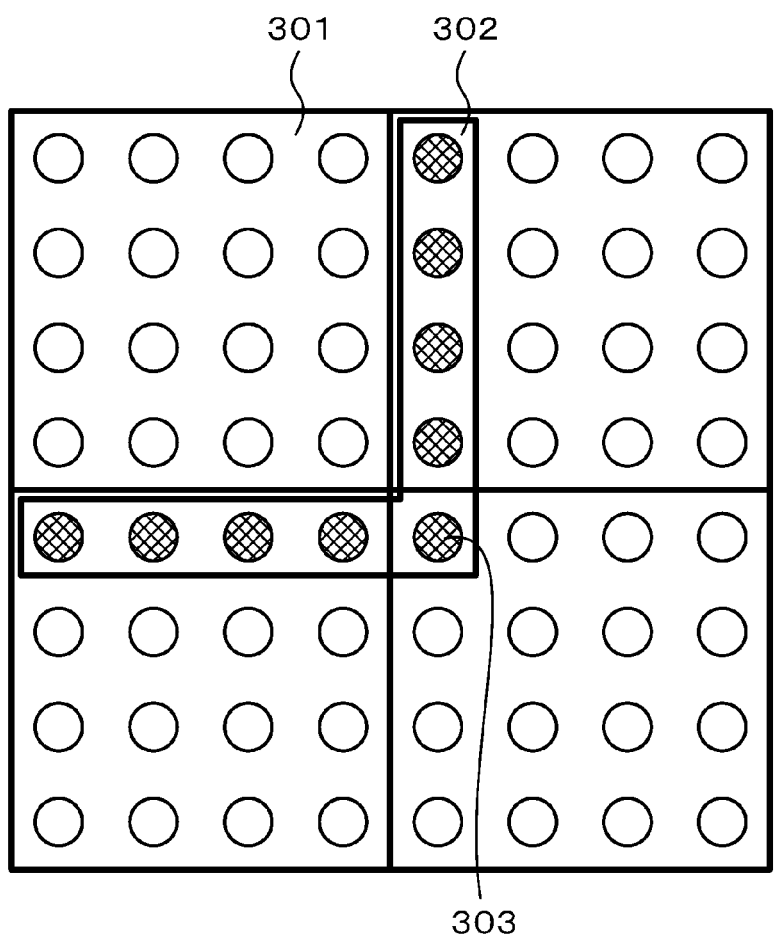
FIG. 10 is a diagram for describing a definition of a neighboring difference coefficient in a significant difference coefficient decoding process of FIG. 13.

FIG. 10 illustrates a neighboring difference coefficient position. A reference numeral 301 indicates a processing target sub block, and a reference numeral 302 indicates a neighboring difference coefficient. A neighboring difference coefficient indicating the outside of the difference coefficient region is excluded from a calculation of the neighboring significant coefficient sum countCoeff. Difference coefficients 303 belonging to sub blocks at the right and lower sides of the processing target sub block can have any of a configuration included in the neighboring difference coefficient and a configuration not included in the neighboring difference coefficient. In the configuration in which the reference numeral 303 is included in the neighboring difference coefficient, the number of neighboring difference coefficients increases, and thus a probability of occurrence of the significant difference coefficient information can be estimated with a high degree of accuracy. In the configuration in which the reference numeral 303 is not included in the neighboring difference coefficient, a computation amount and a circuit size can be reduced due to a reduction in an addition process related to the neighboring significant coefficient sum countCoeff and a reduction in a process of determining the boundary of the difference coefficient region.

The significant coefficient information coding controller 706 decides the difference coefficients of the processing target (S802). The scan order of the difference coefficients in the sub block is assumed to follow the rule illustrated in FIG. 7, similarly to the sub block scan order in the difference coefficient region. When scanning of all significant difference coefficients of the sub block ends, the significant difference coefficient coding process ends, and then the process proceeds to the difference coefficient value coding process (S704).

The significant coefficient information coding controller 706 determines whether or not the neighboring significant coefficient sum countCoeff is 0 (S803).

Figure 11:
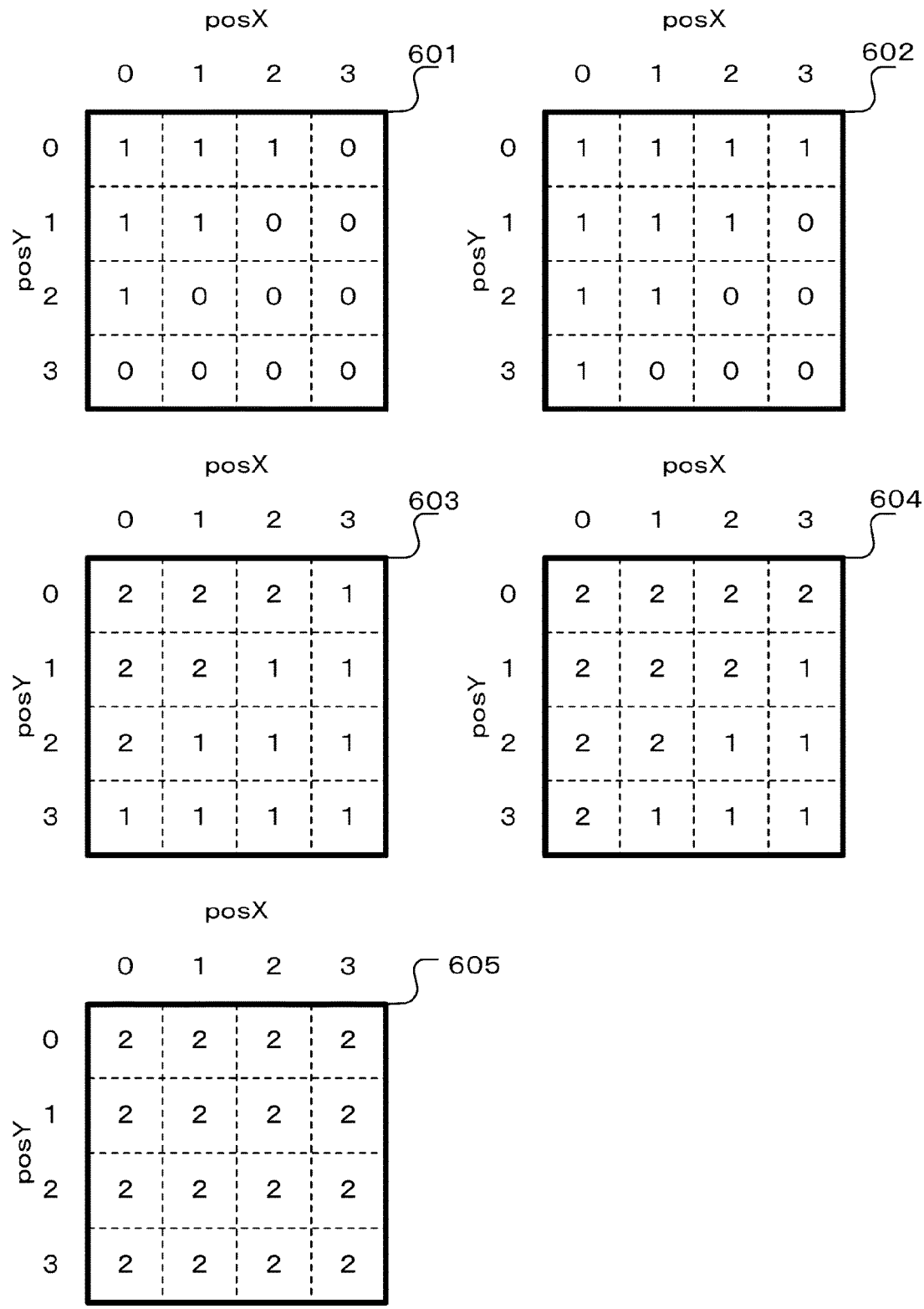
FIG. 11 is a diagram for describing a definition of a context in the significant difference coefficient decoding process of FIG. 4.

When the neighboring significant coefficient sum countCoeff is 0, the processing target difference coefficient position in the processing target sub block is determined (S804). A horizontal-direction difference coefficient position is assumed to be posX, a vertical-direction difference coefficient position is assumed to be posY, and the processing target difference coefficient position is assumed to be pos=posX+posY. When pos<=2, the context index ctxIdx for coding the significant coefficient information is set to 1 (S805), and otherwise (pos>2), the context index ctxIdx is set to 0 (S806). A reference numeral 601 of FIG. 11 indicates a definition of the context index ctxIdx when countCoeff=0.

When the neighboring significant coefficient sum countCoeff is not 0, it is determined whether or not the neighboring significant coefficient sum countCoeff is smaller than or equal to 1 (S807). When the neighboring significant coefficient sum countCoeff is smaller than or equal to 1, the processing target difference coefficient position in the processing target sub block is determined (S808). When pos<=3, the context index ctxIdx for decoding the significant coefficient information is set to 1 (S809), and otherwise (pos>3), the context index ctxIdx is set to 0 (S810). A reference numeral 602 of FIG. 11 indicates a definition of the context index ctxIdx when countCoeff=1.

When the neighboring significant coefficient sum countCoeff is neither smaller than nor equal to 1, it is determined whether or not the neighboring significant coefficient sum countCoeff is smaller than or equal to 2 (S811). When the neighboring significant coefficient sum countCoeff is smaller than or equal to 2, the processing target difference coefficient position in the processing target sub block is determines (S812). When pos<=2, the context index ctxIdx for decoding the significant coefficient information is set to 2 (S813), and otherwise (pos>2), the context index ctxIdx is set to 1 (S814). A reference numeral 603 of FIG. 11 indicates a definition of the context index ctxIdx when countCoeff=2.

When the neighboring significant coefficient sum countCoeff is neither smaller than nor equal to 2, the context index ctxIdx for decoding the significant coefficient information is set to 2 (S815). A reference numeral 605 of FIG. 11 indicates a definition of the context index ctxIdx when countCoeff>2.

The significant coefficient information coding controller 706 derives the difference coefficient of the processing target position from the difference coefficient buffer 702. When the difference coefficient value is not 0, the significant difference coefficient information is set to 1, and otherwise (when the difference coefficient value is 0), the significant difference coefficient information is set to 0 (S816).

The significant coefficient information coding controller 706 reads a context corresponding to the decided context index ctxIdx from the context memory 704, and transfers the significant difference coefficient information and the context to the arithmetic encoder 701. The arithmetic encoder 701 codes the significant difference coefficient information using the context (S817).

[Difference Coefficient Value Coding Process (S705)]

The difference coefficient value coding controller 707 decides the difference coefficients of the processing target (S901). The scan order of the difference coefficients in the sub block is assumed to follow the rule illustrated in FIG. 7, similarly to the scan order of the significant difference coefficients. When scanning of all difference coefficients of the sub block ends, the difference coefficient value coding process ends, and the process proceeds to a process of deciding a next sub block (S601).

The difference coefficient value coding controller 707 determines whether or not the difference coefficient value at the processing target difference coefficient position is 0 (S902). When the difference coefficient value at the processing target difference coefficient position is 0, coding of the difference coefficient value at the processing target difference coefficient position is completed, and the process proceeds to step S901.

When the difference coefficient value at the processing target difference coefficient position is not 0, the absolute value of the coding difference coefficient at the processing target difference coefficient position and a sign are calculated (S903 and S904). When the present process is performed, since the difference coefficient value is decided to be not 0, the coding difference coefficient absolute value is a value obtained by subtracting 1 from the absolute value of the difference coefficient. Further, when the difference coefficient is positive, the sign is set to 0, and when the difference coefficient is negative, the sign is set to 1.

The difference coefficient value coding controller 707 reads a context from the context memory 704, and transfers the coding absolute value and the context to the arithmetic encoder 701. The arithmetic encoder 701 decides the coding absolute value using the context (S905).

The difference coefficient value coding controller 707 reads a context from the context memory 704, and transfers the coding absolute value and the context to the arithmetic encoder 701. The arithmetic encoder 701 decides the coding absolute value using the context (S905).

[Decoding Process]

A first embodiment of a difference coefficient decoding method according to an embodiment of the present will be described. FIG. 8 is a block diagram illustrating a detailed configuration of the difference information decoder 801 of FIG. 6 according to the first embodiment. The difference information decoder 801 according to the first embodiment includes an arithmetic decoder 1001, a difference coefficient buffer 1002, a decoding controller 1003, a context memory 1004, and a scan controller 1005, and the decoding controller 1003 includes a significant coefficient information decoding controller 1006, a difference coefficient value decoding controller 1007, and a significant sub block information decoding controller 1008.

Since the difference information decoding process in the difference information decoder 801 of FIG. 8 corresponds to the difference information coding process in the difference information encoder 507 of FIG. 5, the respective components of the difference coefficient buffer 1002, the context memory 1004, and the scan controller 1005 in the difference information decoder of FIG. 8 have functions corresponding to the respective components of the difference coefficient buffer 702, the context memory 704, and the scan controller 705 of FIG. 15.

Next, the difference information decoding process will be described with reference to the flowcharts of FIGS. 1, 2, 4, and 13.

The scan controller 1005 decides a processing target sub block (S101). When scanning of all sub blocks ends, the difference coefficient decoding process ends. 902 in FIG. 7 indicates a sub block scan order. In the present process, scanning starts from a lower rightmost sub block in a difference coefficient region, is performed according to a rule of proceeding from the under right to the upper left and then from the under right to the upper left, and ends at a upper leftmost sub block. 901 in FIG. 7 is a diagram illustrating a sub block scan order using arrows. When scanning is performed according to the scan order of FIG. 7, it becomes a state in which scanning of sub blocks positioned at spatially right and lower sides among processing target sub blocks is completed. The sub block decoding process is performed on the processing target sub block (S102).

[Sub Block Decoding (S102)]

The significant sub block information decoding controller 1008 decides a context for decoding the significant sub block information with reference to difference coefficients included in a coded sub block neighboring the processing target sub block from the difference coefficient buffer 1002, and reads the decided context from the context memory 1004. The context and a decoding command are transferred to the arithmetic decoder 1001. The arithmetic decoder 1001 performs a bitstream decoding process using the context, and decodes the significant sub block information (S201).

The significant sub block information decoding controller 1008 determines a value of the significant sub block information (S202). When the significant sub block information is 0, all the difference coefficient values of the processing target sub block of the difference coefficient buffer 1002 are set to 0 (S209), and the sub block difference coefficient value decoding process ends.

When the significant sub block information is 1, the decoding process is performed on all significant difference coefficient information of the processing target sub block (S203). The details of the sub block significant difference coefficient information decoding process will be described later. After the decoding of all significant difference coefficient information of the sub block ends, the process proceeds to decoding of the difference coefficient value of step S204.

The decoding process of all the difference coefficient values of the processing target sub block is performed (S204). The details of the sub block difference coefficient value decoding process will be described later. After the decoding of all the difference coefficient values of the sub block ends, the process proceeds to step S101.

[Significant Difference Coefficient Information Decoding Process (S203)]

The significant coefficient information decoding controller 1006 calculates the sum countCoeff of the number of significant difference coefficients neighboring the processing target difference coefficient position (S401). In the present process, difference coefficients belonging to sub blocks positioned at spatially right and lower sides of the processing target sub block and neighboring the processing target sub block are defined as neighboring difference coefficients.

FIG. 10 illustrates a neighboring difference coefficient position. A reference numeral 301 indicates a processing target sub block, and a reference numeral 302 indicates a neighboring difference coefficient. A neighboring difference coefficient indicating the outside of the difference coefficient region is excluded from a calculation of the neighboring significant coefficient sum countCoeff. Difference coefficients 303 belonging to sub blocks at the right and lower sides of the processing target sub block can have any of a configuration included in the neighboring difference coefficient and a configuration not included in the neighboring difference coefficient. In the configuration in which the reference numeral 303 is included in the neighboring difference coefficient, the number of neighboring difference coefficients increases, and thus a probability of occurrence of the significant difference coefficient information can be estimated with a high degree of accuracy. In the configuration in which the reference numeral 303 is not included in the neighboring difference coefficient, a computation amount and a circuit size can be reduced due to a reduction in an addition process related to the neighboring significant coefficient sum countCoeff and a reduction in a process of determining the boundary of the difference coefficient region.

The significant coefficient information decoding controller 1006 decides the difference coefficients of the processing target (S402). The scan order of the difference coefficients in the sub block is assumed to follow the rule illustrated in FIG. 7, similarly to the sub block scan order in the difference coefficient region. When scanning of all significant difference coefficients of the sub block ends, the significant difference coefficient decoding process is completed, and then the process proceeds to the difference coefficient value decoding process (S204). The significant coefficient information decoding controller 1006 determines whether or not the neighboring significant coefficient sum countCoeff is 0 (S403). When the neighboring significant coefficient sum countCoeff is 0, the processing target difference coefficient position in the processing target sub block is determined (S404). A horizontal-direction difference coefficient position is assumed to be posX, a vertical-direction difference coefficient position is assumed to be posY, and the processing target difference coefficient position is assumed to be pos=posX+posY. When pos<=2, the context ctxIdx for decoding the significant coefficient information is set to 1 (S405), and otherwise (pos>2), the context ctxIdx is set to 0 (S406). A reference numeral 601 of FIG. 11 indicates a definition of the context when countCoeff=0. After the decided context is read from the context memory 1004, the context and the decoding command are transferred to the arithmetic decoder 1001. The arithmetic decoder 1001 performs the bitstream decoding process using the context, and decodes the significant difference coefficient information (S416).

When the neighboring significant coefficient sum countCoeff is not 0, it is determined whether or not the neighboring significant coefficient sum countCoeff is smaller than or equal to 1 (S407). When the neighboring significant coefficient sum countCoeff is smaller than or equal to 1, the processing target difference coefficient position in the processing target sub block is determined (S408). When pos<=3, the context index ctxIdx for decoding the significant coefficient information is set to 1 (S409), and otherwise (pos>3), the context index ctxIdx is set to 0 (S410). A reference numeral 602 of FIG. 11 indicates a definition of the context when countCoeff=1. After the decided context is read from the context memory 1004, the context and the decoding command are transferred to the arithmetic decoder 1001. The arithmetic decoder 1001 performs the bitstream decoding process using the context, and decodes the significant difference coefficient information (S416).

When the neighboring significant coefficient sum countCoeff is neither smaller than nor equal to 1, it is determined whether or not the neighboring significant coefficient sum countCoeff is smaller than or equal to 2 (S411). When the neighboring significant coefficient sum countCoeff is smaller than or equal to 2, the processing target difference coefficient position in the processing target sub block is determined (S412). When pos<=2, the context index ctxIdx for decoding the significant coefficient information is set to 2 (S413), and otherwise (pos>2), the context index ctxIdx is set to 1 (S414). A reference numeral 603 of FIG. 11 indicates a definition of the context when countCoeff=2. After the decided context is read from the context memory 1004, the context and the decoding command are transferred to the arithmetic decoder 1001. The arithmetic decoder 1001 performs the bitstream decoding process using the context, and decodes the significant difference coefficient information (S416).

When the neighboring significant coefficient sum countCoeff is neither smaller than nor equal to 2, the context index ctxIdx for decoding the significant coefficient information is set to 2 (S415). A reference numeral 605 of FIG. 11 indicates a definition of the context when countCoeff>2. After the decided context is read from the context memory 1004, the context and the decoding command are transferred to the arithmetic decoder 1001. The arithmetic decoder 1001 performs the bitstream decoding process using the context, and decodes the significant difference coefficient information (S416).

When the neighboring significant coefficient sum countCoeff is large, all significant coefficient information in the processing target sub block is likely to be 1. Thus, in the above process, when the neighboring significant coefficient sum countCoeff is larger than or equal to 3, ctxIdx is set to 2 regardless of the value of pos. Further, it is also possible to break down the determination condition of the neighboring significant coefficient sum countCoeff. For example, in the case in which the neighboring significant coefficient sum countCoeff is larger than or equal to 3, the context index definition of the reference numeral 604 of FIG. 11 can be used when the neighboring significant coefficient sum countCoeff is 3, and the context index definition of the reference numeral 605 of FIG. 11 can be used when the neighboring significant coefficient sum countCoeff is larger than or equal to 4. Through this configuration, it is possible to improve neighboring information correlation use efficiency and coding efficiency.

In the present process, the sum of the number of significant coefficient information of decoded neighboring sub blocks and the position of a processing target difference coefficient in a sub block are referred to in calculating the context index ctxIdx for the significant difference coefficient information. The reason of using this configuration is described below.

Commonly, orthogonal transform coefficients of a picture are likely to be concentrated on low frequency components, and the significant coefficient information is likely to be 1. Further, since the high frequency component of the orthogonal transform coefficient is hardly visually affected and often coarsely quantized, the coefficient value of the high frequency component becomes 0, and the significant coefficient information of the high frequency component is likely to be 0. This feature is not limited to the entire difference coefficient region and similarly applies to each sub block without, and the significant coefficient information of components of a sub block at a low frequency range side is more likely to be 1 than that of components of the same sub block at a high frequency range side. When the value of the context index ctxIdx of the significant difference coefficient information at the low frequency range in the sub block is set to be larger than the value of the context index ctxIdx of the significant difference coefficient information at the high frequency range, the estimation accuracy of the probability of occurrence of the significant coefficient information is improved. Further, in the high frequency range in which the significant difference coefficient is likely to be 0, the neighboring significant coefficient sum is also small, and in the low frequency range in which the significant difference coefficient is likely to be 1, the neighboring significant coefficient sum strongly tends to be large, and when the neighboring significant coefficient sum is used as an index indicating how much the target sub block includes the significant difference coefficient information, the estimation accuracy of the probability of occurrence of the significant coefficient information is improved.

In the present process, it is possible to calculate the context indices of all coefficient positions in the sub block by calculating the neighboring significant difference coefficient sum for the sub block only once. Compared to the method of individually calculating the neighboring significant difference coefficient sum at each coefficient position, it is possible to reduce the computation amount of the neighboring significant difference coefficient sum. Further, in the configuration of using a decoding result of an immediately previous significant difference coefficient in the scan order for a calculation of the context index, it is necessary to sequentially perform a calculation of the context index in the sub block and decoding of the significant difference coefficient. In the present embodiment, the neighboring significant difference coefficient sum and the processing target coefficient position are referred to for a calculation of the context index, but since the difference coefficients belonging to the processing target sub block are not used for the neighboring significant difference coefficient sum, there is no dependence relation between sub blocks in the calculation of the context index. Since it is possible to calculate the context indices for all the significant difference coefficients at the beginning of the sub block, it is possible to perform the calculation of the context index and the decoding process of the significant difference coefficient information in parallel. It is possible to reduce the processing delay related to decoding of the significant coefficient information that is high in the frequency of occurrence in the bitstream.

Figure 20:
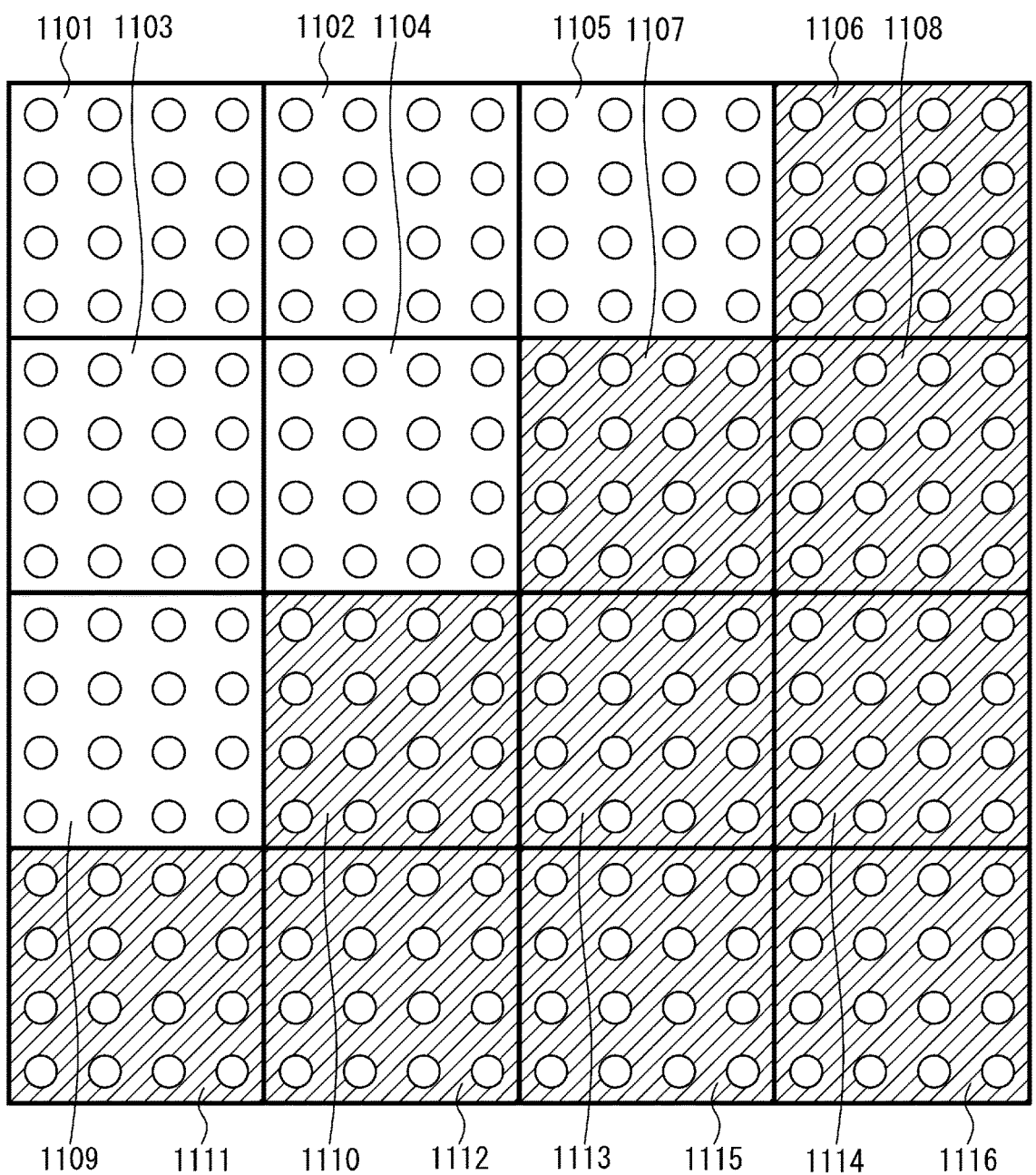
FIG. 20 is a diagram for describing a configuration of using a sub block position for a calculation of a context of significant difference coefficient information.

Instead of referring to the neighboring significant coefficient, it is possible to calculate the context with reference to the significant sub block information. In other words, it is possible to calculate the context based on the sum of neighboring significant sub block information other than the sum of neighboring significant coefficients. For example, a configuration of using the sum of significant sub block information of a neighboring sub block at the right side of a processing target sub block and significant sub block information of a neighboring sub block at the lower side of the processing target sub block can reduce the computation amount and the circuit size compared to the above-described configuration. Further, it is possible to use a sub block position for a context calculation. As described above, there is a feature in which the low frequency component is higher in the probability of occurrence of the significant coefficient than the high frequency range. As the sub block position is used for the context calculation, high-accuracy context estimation can be implemented. FIG. 20 illustrates an example in which the difference coefficient region is divided into two regions of a low frequency region and a high frequency region. In FIG. 20, reference numerals 1101, 1102, 1103, 1104, 1105, and 1109 indicate low frequency components, and reference numerals 1106, 1107, 1108, 1110, 1111, 1112, 1113, 1114, 1115, and 1116 indicate high frequency regions. A configuration of calculating the context index ctxIdx in the above-described process for the high frequency region and then adding an offset according to a certain sub block position to the context index ctxIdx for the low frequency region may be used, and a configuration of adding conditional branching to a sub block position while calculating the context index ctxIdx for the low frequency region may be used. Further, a configuration of calculating the context index ctxIdx in the above-described process for the low frequency region and then consistently set the context ctxIdx=0 for the high frequency region since the significant difference coefficient is usually likely to be 0, and the number of neighboring significant difference coefficients is likely to have a probability estimation error may be used.

Further, it is possible to calculate the context index the sum of neighboring coefficient absolute values using the neighboring coefficient absolute values instead of the neighboring significant difference coefficient sum. Since the difference coefficient absolute value of the low frequency component is commonly large, when the sum of neighboring difference coefficient absolute values is large, it is possible to improve the coding efficiency by setting the context so that the probability of occurrence of the significant difference coefficient information is high.

Furthermore, it is possible to improve the context estimation accuracy by adding the prediction mode used to calculate the difference coefficient to a condition determination in the process of calculating the context index of the significant difference coefficient. It is because of a feature difference in which commonly, compared to the intra prediction in which only a decoded region of a decoding target picture is used as a reference target, the inter prediction in which it is possible to refer to a plurality of decoded pictures is high in the prediction accuracy and a difference hardly occurs.

[Difference coefficient value decoding process (S204)]

The significant coefficient information decoding controller 1006 decides the difference coefficients of the processing target (S501). The scan order of the difference coefficients in the sub block is assumed to follow the rule illustrated in FIG. 7, similarly to the scan order of the significant difference coefficients. When scanning of all difference coefficients of the sub block ends, the difference coefficient value decoding process is completed, and the process proceeds to a process of deciding a next sub block (S101).

The significant coefficient information decoding controller 1006 determines whether or not the difference coefficient value at the processing target difference coefficient position is 0 (S502). When the difference coefficient value at the processing target difference coefficient position is 0, decoding of the difference coefficient value at the processing target difference coefficient position is completed, and the process proceeds to step S501.

When the difference coefficient value at the processing target difference coefficient position is 1, the absolute value of the difference coefficient at the processing target difference coefficient position is decoded (S503). When the present process is performed, the difference coefficient value is decided to be not 0, and code words according to values obtained by subtracting 1 from the absolute values of the difference coefficients are decoded as a bitstream. Thus, a value obtained by adding 1 to a value obtained by entropy-decoding a code word is set as the absolute value of the difference coefficient.

The sign of the difference coefficient at the processing target difference coefficient position is decoded (S504). The difference coefficient value is decided based on the absolute value of the difference coefficient and the sign of the difference coefficient.

In the present embodiment, the context index for decoding the significant difference coefficient information is calculated based on the significant difference coefficient information of the decoded sub block, but a similar process can be applied to a calculation of the context index of the difference coefficient value. Since the difference coefficient value has a correlation with the neighboring coefficient value and has a feature of being concentrated on the low frequency component similarly to the significant difference coefficient information, the difference coefficient value can be efficiently coded by setting a context index indicating that a probability of occurrence of a large difference coefficient value is high when the neighboring significant difference coefficient sum or the neighboring difference coefficient absolute value sum is large and setting a context index indicating that a probability of occurrence of a small difference coefficient value is high when the neighboring significant difference coefficient sum or the neighboring difference coefficient absolute value sum is small.

The picture coding device and the picture decoding device according to the first embodiment have the following effects.

(1) It is possible to calculate a context index of a processing target difference coefficient based on difference coefficients belonging to a decoded sub block neighboring a sub block to which the processing target difference coefficient belongs. It is possible to set an appropriate probability model based on a neighboring correlation of significant difference coefficient information by setting a context estimating that a probability of occurrence of significant difference coefficient information 1 is high when a neighboring significant difference coefficient sum is large and that a probability of occurrence of significant difference coefficient information 0 is high when a neighboring significant difference coefficient sum is small. Accordingly, it is possible to efficiently code significant difference coefficient information.

(2) A context index is calculated based on a position of a processing target difference coefficient in a sub block. A context is set to estimate that difference coefficients at a low frequency range in a sub block are higher in a probability of occurrence of a significant difference coefficient 1 than difference coefficients at a high frequency range in a sub block. It is possible to set an appropriate probability model based on a feature of significant difference coefficient information on a frequency region, and it is possible to efficiently code significant difference coefficient information.

(3) A calculation of a neighboring significant difference coefficient sum and a position of a processing target difference coefficient in a sub block do not depend on a decoding result of significant difference coefficient information in a sub block. Thus, since it is possible to provide a configuration of processing a calculation of a context index in a sub block and decoding of significant difference coefficient information in parallel, it is possible to reduce a processing delay related to a decoding process of significant difference coefficient information. It is possible to implement a decoding device that is an occupancy ratio of difference coefficients on a bitstream, large in the number of processing, and suitable for real-time processing as a processing delay of significant difference coefficient information is reduced. Further, in a coding device, similarly, it is possible to reduce a processing delay of significant difference coefficient information coding.

(4) A single calculation has only to be performed in a sub block since a calculation result based on a neighboring significant difference coefficient sum related to a calculation of a context index of significant difference coefficient information, that is, the sum of significant sub block information, significant difference coefficient information, or difference coefficient absolute values does not depend on a position of a processing target difference coefficient. It is possible to reduce a computation amount related to a context index calculation compared to a configuration of calculating an individual neighboring significant difference coefficient sum according to a processing target difference coefficient position.

A bitstream of a picture output from the picture coding device according to the embodiment has a specific data format that can be decoded according to a coding technique used in the embodiment, and the picture decoding device corresponding to the picture coding device can decode the bitstream of the specific data format.

In order to exchange a bitstream between the picture coding device and the picture decoding device, when a wired or wireless network is used, a bitstream may be converted to have a data format suitable for a transmission form of a transmission path and then transmitted. In this case, a picture transmitting device that converts the bitstream output from the picture coding device into coding data of the data format suitable for the transmission form of the communication path and then transmits the coding data to the network and a picture receiving device that receives the coding data from the network, reconstructs the bitstream, and supplies the bitstream to the picture decoding device are provided.

The picture transmitting device includes a memory that buffers the bitstream output from the picture coding device, a packet processor that packetizes the bitstream, and a transmitter that transmits the packetized coding data via the network. The picture receiving device includes a receiver that receives the packetized coding data via the network, a memory that buffers the received coding data, and a packet processor that performs packet processing on the coding data, constructs the bitstream, and supplies the bitstream to the picture decoding device.

Further, the process related to the coding and the decoding can be implemented as a transmitting, accumulating, or receiving device using hardware and can be implemented by firmware stored in read only memory (ROM), flash memory, or the like or computer software or the like. The firmware program and the software program can be recorded in a computer readable recording medium and provided, can be provided from a server via a wired or wireless network, or can be provided as data broadcasting of a terrestrial or satellite digital broadcasting.

The exemplary embodiments of the present invention have been described so far. The embodiment is an example, and it should be understood by those skilled in the art that the combination of the respective components or the respective processing processes can be variously modified, and various modifications can also be within the scope of the present invention.

[Item 1] A picture coding device that partitions difference information between a picture serving as a coding target and a picture serving as a prediction target into a plurality of sub blocks, and codes the partitioned sub block in a certain order, the picture coding device comprising:

a significant sub block information encoder that codes significant sub block information indicating whether or not all values of difference coefficients belonging to the sub block are zero;

a significant difference coefficient information encoder that codes significant difference coefficient information indicating whether or not the value of the difference coefficient is zero;

a difference coefficient value encoder that codes the value of the difference coefficient; and a context deriver that derives a context for coding the significant difference coefficient information of the sub block serving as the coding target based on at least one of the significant sub block information, the significant difference coefficient information, and the value of the difference coefficient of the coded sub block neighboring the sub block serving as the coding target.

[Item 2] The picture coding device according to Item 1, wherein the context deriver derives an index based on at least one of the significant sub block information of the coded sub blocks that neighbor the sub block serving as the coding target at right and lower sides of the sub block serving as the coding target, one or more of the significant difference coefficient information belonging to the coded sub blocks, and one or more of the values of the difference coefficients belonging to the coded sub blocks, and derives the context based on the derived index.

[Item 3] The picture coding device according to Item 2, wherein the context deriver further derives the context based on a position of the difference coefficient belonging to the sub block serving as the coding target.

[Item 4] The picture coding device according to Item 2 or 3, wherein the index is derived based on at least one of an addition formula using the significant sub block information, an addition formula using each significant difference coefficient information, and an addition formula using an absolute value of the difference coefficient for the coded sub blocks that neighbor at the right and lower sides.

[Item 5] A picture coding method of partitioning difference information between a picture serving as a coding target and a picture serving as a prediction target into a plurality of sub blocks, and codes the partitioned sub block in a certain order, the picture coding method comprising:
coding significant sub block information indicating whether or not all values of difference coefficients belonging to the sub block are zero;
coding significant difference coefficient information indicating whether or not the value of the difference coefficient is zero;
coding the value of the difference coefficient; and
deriving a context for coding the significant difference coefficient information of the sub block serving as the coding target based on at least one of the significant sub block information, the significant difference coefficient information, and the value of the difference coefficient of the coded sub block neighboring the sub block serving as the coding target.

[Item 6] The picture coding method according to Item 5, wherein the context deriving includes deriving an index based on at least one of the significant sub block information of the coded sub blocks that neighbor the sub block serving as the coding target at right and lower sides of the sub block serving as the coding target, one or more of the significant difference coefficient information belonging to the coded sub blocks, and one or more of the values of the difference coefficients belonging to the coded sub blocks, and derives the context based on the derived index.

[Item 7] The picture coding method according to Item 6, wherein the context deriving further includes deriving the context based on a position of the difference coefficient belonging to the sub block serving as the coding target.

[Item 8] The picture coding method according to Item 6 or 7, wherein the index is derived based on at least one of an addition formula using the significant sub block information, an addition formula using each significant difference coefficient information, and an addition formula using an absolute value of the difference coefficient for the coded sub blocks that neighbor at the right and lower sides.

[Item 9] A picture coding program embedded on a non-transitory computer-readable recording medium and partitioning difference information between a picture serving as a coding target and a picture serving as a prediction target into a plurality of sub blocks, and codes the partitioned sub block in a certain order, the program comprising:
coding significant sub block information indicating whether or not all values of difference coefficients belonging to the sub block are zero;
coding significant difference coefficient information indicating whether or not the value of the difference coefficient is zero;
coding the value of the difference coefficient; and
deriving a context for coding the significant difference coefficient information of the sub block serving as the coding target based on at least one of the significant sub block information, the significant difference coefficient information, and the value of the difference coefficient of the coded sub block neighboring the sub block serving as the coding target.

[Item 10] The picture coding program according to Item 9, wherein the context deriving includes deriving an index based on at least one of the significant sub block information of the coded sub blocks that neighbor the sub block serving as the coding target at right and lower sides of the sub block serving as the coding target, one or more of the significant difference coefficient information belonging to the coded sub blocks, and one or more of the values of the difference coefficients belonging to the coded sub blocks, and derives the context based on the derived index.

[Item 11] The picture coding program according to Item 10, wherein the context deriving further includes deriving the context based on a position of the difference coefficient belonging to the sub block serving as the coding target.

[Item 12] The picture coding program according to Item 10 or 11, wherein the index is derived based on at least one of an addition formula using the significant sub block information, an addition formula using each significant difference coefficient information, and an addition formula using an absolute value of the difference coefficient for the coded sub blocks that neighbor at the right and lower sides.

[Item 13] A transmitting device, comprising:
a packet processor that packetizes a bitstream coded by a picture coding method of partitioning difference information between a picture serving as a coding target and a picture serving as a prediction target into a plurality of sub blocks, and codes the partitioned sub block in a certain order, and obtain coding data; and
a transmitter that transmits the packetized coding data,
wherein the picture coding method includes
coding significant sub block information indicating whether or not all values of difference coefficients belonging to the sub block are zero,
coding significant difference coefficient information indicating whether or not the value of the difference coefficient is zero,
coding the value of the difference coefficient, and
deriving a context for coding the significant difference coefficient information of the sub block serving as the coding target based on at least one of the significant sub block information, the significant difference coefficient information, and the value of the difference coefficient of the coded sub block neighboring the sub block serving as the coding target.

[Item 14] A transmission method, comprising:

packetizing a bitstream coded by a picture coding method of partitioning difference information between a picture serving as a coding target and a picture serving as a prediction target into a plurality of sub blocks, and codes the partitioned sub block in a certain order, and obtaining coding data; and transmitting the packetized coding data, wherein the picture coding method includes coding significant sub block information indicating whether or not all values of difference coefficients belonging to the sub block are zero, coding significant difference coefficient information indicating whether or not the value of the difference coefficient is zero, coding the value of the difference coefficient, and deriving a context for coding the significant difference coefficient information of the sub block serving as the coding target based on at least one of the significant sub block information, the significant difference coefficient information, and the value of the difference coefficient of the coded sub block neighboring the sub block serving as the coding target.

[Item 15] A transmission program embedded on a non-transitory computer-readable recording medium, comprising:

packetizing a bitstream coded by a picture coding method of partitioning difference information between a picture serving as a coding target and a picture serving as a prediction target into a plurality of sub blocks, and codes the partitioned sub block in a certain order, and obtaining coding data; and transmitting the packetized coding data, wherein the picture coding method includes coding significant sub block information indicating whether or not all values of difference coefficients belonging to the sub block are zero, coding significant difference coefficient information indicating whether or not the value of the difference coefficient is zero, coding the value of the difference coefficient, and deriving a context for coding the significant difference coefficient information of the sub block serving as the coding target based on at least one of the significant sub block information, the significant difference coefficient information, and the value of the difference coefficient of the coded sub block neighboring the sub block serving as the coding target.

[Item 16] A picture decoding device that decodes a bitstream obtained by partitioning difference information between a picture serving as a decoding target and a picture serving as a prediction target into a plurality of sub blocks and coding the partitioned sub block in a certain order, the picture decoding device comprising:

a significant sub block information decoder that decodes significant sub block information indicating whether or not all values of difference coefficients belonging to the sub block are zero;

a significant difference coefficient information decoder that decodes significant difference coefficient information indicating whether or not the value of the difference coefficient is zero;

a difference coefficient value decoder that decodes the value of the difference coefficient; and a context deriver that derives a context for decoding the significant difference coefficient information of the sub block serving as the decoding target based on at least one of the significant sub block information, the significant difference coefficient information, and the value of the difference coefficient of the decoded sub block neighboring the sub block serving as the decoding target.

[Item 17] The picture decoding device according to Item 16, wherein the context deriver derives an index based on at least one of the significant sub block information of the decoded sub blocks that neighbor the sub block serving as the decoding target at right and lower sides of the sub block serving as the decoding target, one or more of the significant difference coefficient information belonging to the decoded sub blocks, and one or more of the values of the difference coefficients belonging to the decoded sub blocks, and derives the context based on the derived index.

[Item 18] The picture decoding device according to Item 17, wherein the context deriver further derives the context based on a position of the difference coefficient belonging to the sub block serving as the decoding target.

[Item 19] The picture decoding device according to Item 17 or 18, wherein the index is derived based on at least one of an addition formula using the significant sub block information, an addition formula using each significant difference coefficient information, and an addition formula using an absolute value of the difference coefficient for the decoded sub blocks that neighbor at the right and lower sides.

[Item 20] A picture decoding method that decodes a bitstream obtained by partitioning difference information between a picture serving as a decoding target and a picture serving as a prediction target into a plurality of sub blocks and coding the partitioned sub block in a certain order, the picture decoding method comprising:

decoding significant sub block information indicating whether or not all values of difference coefficients belonging to the sub block are zero;

decoding significant difference coefficient information indicating whether or not the value of the difference coefficient is zero;

decoding the value of the difference coefficient; and deriving a context for decoding the significant difference coefficient information of the sub block serving as the decoding target based on at least one of the significant sub block information, the significant difference coefficient information, and the value of the difference coefficient of the decoded sub block neighboring the sub block serving as the decoding target.

[Item 21] The picture decoding method according to Item 20, wherein the context deriving includes deriving an index based on at least one of the significant sub block information of the decoded sub blocks that neighbor the sub block serving as the decoding target at right and lower sides of the sub block serving as the decoding target, one or more of the significant difference coefficient information belonging to the decoded sub blocks, and one or more of the values of the difference coefficients belonging to the decoded sub blocks, and deriving the context based on the derived index.

[Item 22] The picture decoding method according to Item 21, wherein the context deriving further includes deriving the context based on a position of the difference coefficient belonging to the sub block serving as the decoding target.

[Item 23] The picture decoding method according to Item 21 or 22, wherein the index is derived based on at least one of an addition formula using the significant sub block information, an addition formula using each significant difference coefficient information, and an addition formula using an absolute value of the difference coefficient for the decoded sub blocks that neighbor at the right and lower sides.

[Item 24] A picture decoding program embedded on a non-transitory computer-readable recording medium and decoding a bitstream obtained by partitioning difference information between a picture serving as a decoding target and a picture serving as a prediction target into a plurality of sub blocks and coding the partitioned sub block in a certain order, the program comprising:

decoding significant sub block information indicating whether or not all values of difference coefficients belonging to the sub block are zero;

decoding significant difference coefficient information indicating whether or not the value of the difference coefficient is zero;

decoding the value of the difference coefficient; and deriving a context for decoding the significant difference coefficient information of the sub block serving as the decoding target based on at least one of the significant sub block information, the significant difference coefficient information, and the value of the difference coefficient of the decoded sub block neighboring the sub block serving as the decoding target.

[Item 25] The picture decoding program according to Item 24, wherein the context deriving includes deriving an index based on at least one of the significant sub block information of the decoded sub blocks that neighbor the sub block serving as the decoding target at right and lower sides of the sub block serving as the decoding target, one or more of the significant difference coefficient information belonging to the decoded sub blocks, and one or more of the values of the difference coefficients belonging to the decoded sub blocks, and deriving the context based on the derived index.

[Item 26] The picture decoding program according to Item 25, wherein the context deriving further includes deriving the context based on a position of the difference coefficient belonging to the sub block serving as the decoding target.

[Item 27] The picture decoding program according to Item 25 or 26, wherein the index is derived based on at least one of an addition formula using the significant sub block information, an addition formula using each significant difference coefficient information, and an addition formula using an absolute value of the difference coefficient for the decoded sub blocks that neighbor at the right and lower sides.

[Item 28] A receiving device that receives a bitstream obtained by coding a moving picture and decodes the received bitstream, comprising:

a receiver that receives coding data obtained by packetizing a bitstream obtained by partitioning difference information between a picture serving as a decoding target and a picture serving as a prediction target into a plurality of sub blocks and coding the partitioned sub block in a certain order;

a reconstructor that performs packet processing on the received packetized coding data to reconstruct the bitstream;

a significant sub block information decoder that decodes significant sub block information indicating whether or not all values of difference coefficients belonging to the sub block are zero from the reconstructed bitstream;

a significant difference coefficient information decoder that decodes significant difference coefficient information indicating whether or not the value of the difference coefficient is zero from the reconstructed bitstream;

a difference coefficient value decoder that decodes the value of the difference coefficient from the reconstructed bitstream; and a context deriver that derives a context for decoding the significant difference coefficient information of the sub block serving as the decoding target based on at least one of the significant sub block information, the significant difference coefficient information, and the value of the difference coefficient of the decoded sub block neighboring the sub block serving as the decoding target.

[Item 29] A reception method of receiving a bitstream obtained by coding a moving picture and decoding the received bitstream, comprising:

receiving coding data obtained by packetizing a bitstream obtained by partitioning difference information between a picture serving as a decoding target and a picture serving as a prediction target into a plurality of sub blocks and coding the partitioned sub block in a certain order;

performing packet processing on the received packetized coding data to reconstruct the bitstream;

decoding significant sub block information indicating whether or not all values of difference coefficients belonging to the sub block are zero from the reconstructed bitstream;

decoding significant difference coefficient information indicating whether or not the value of the difference coefficient is zero from the reconstructed bitstream;

decoding the value of the difference coefficient from the reconstructed bitstream; and deriving a context for decoding the significant difference coefficient information of the sub block serving as the decoding target based on at least one of the significant sub block information, the significant difference coefficient information, and the value of the difference coefficient of the decoded sub block neighboring the sub block serving as the decoding target.

[Item 30] A reception program embedded on a non-transitory computer-readable recording medium and receiving a bitstream obtained by coding a moving picture and decoding the received bitstream, the program comprising:

receiving coding data obtained by packetizing a bitstream obtained by partitioning difference information between a picture serving as a decoding target and a picture serving as a prediction target into a plurality of sub blocks and coding the partitioned sub block in a certain order;

performing packet processing on the received packetized coding data to reconstruct the bitstream;

decoding significant sub block information indicating whether or not all values of difference coefficients belonging to the sub block are zero from the reconstructed bitstream;

decoding significant difference coefficient information indicating whether or not the value of the difference coefficient is zero from the reconstructed bitstream;

decoding the value of the difference coefficient from the reconstructed bitstream; and deriving a context for decoding the significant difference coefficient information of the sub block serving as the decoding target based on at least one of the significant sub block information, the significant difference coefficient information, and the value of the difference coefficient of the decoded sub block neighboring the sub block serving as the decoding target.

What is claimed is:

1. A picture decoding device that decodes a bitstream obtained by partitioning difference information between a picture serving as a decoding target and a picture serving as a prediction target into a plurality of sub blocks and coding partitioned sub blocks in a certain order, the picture decoding device comprising:
- a significant sub block information decoder that decodes significant sub block information indicating whether or not all values of difference coefficients belonging to a sub block serving as a decoding target are zero;
- a significant difference coefficient information decoder that decodes significant difference coefficient information indicating whether or not value of a difference coefficient is zero;
- a difference coefficient value decoder that decodes the value of the difference coefficient; and
- a context deriver that derives a context for decoding the significant difference coefficient information of difference coefficient serving as the decoding target based on sum of horizontal position and vertical position of the difference coefficient in sub block serving as the decoding target, and at least one of (1) the significant sub block information of decoded sub blocks neighboring to the sub block serving as the decoding target, (2) the significant difference coefficient information of difference coefficients belonging to decoded sub blocks neighboring to the sub block serving as the decoding target, or (3) values of difference coefficients belonging to decoded sub blocks neighboring to the sub block serving as the decoding target.

2. A picture decoding method that decodes a bitstream obtained by partitioning difference information between a picture serving as a decoding target and a picture serving as a prediction target into a plurality of sub blocks and coding partitioned sub blocks in a certain order, the picture decoding method comprising:
- decoding significant sub block information indicating whether or not all values of difference coefficients belonging to a sub block serving as a decoding target are zero;
- decoding significant difference coefficient information indicating whether or not value of a difference coefficient is zero;
- decoding the value of the difference coefficient; and
- deriving a context for decoding the significant difference coefficient information of difference coefficient serving as the decoding target based on sum of horizontal position and vertical position of the difference coefficient in sub block serving as the decoding target, and at least one of (1) the significant sub block information of decoded sub blocks neighboring to the sub block serving as the decoding target, (2) the significant difference coefficient information of difference coefficients belonging to decoded sub blocks neighboring to the sub block serving as the decoding target, or (3) values of difference coefficients belonging to decoded sub blocks neighboring to the sub block serving as the decoding target.

3. A non-transitory computer-readable recording medium having embodied thereon a picture decoding program decoding a bitstream obtained by partitioning difference information between a picture serving as a decoding target and a picture serving as a prediction target into a plurality of sub blocks and coding partitioned sub blocks in a certain order, the program comprising:
- decoding significant sub block information indicating whether or not all values of difference coefficients belonging to a sub block serving as a decoding target are zero;
- decoding significant difference coefficient information indicating whether or not value of a difference coefficient is zero;
- decoding the value of the difference coefficient; and
- deriving a context for decoding the significant difference coefficient information of difference coefficient serving as the decoding target based on sum of horizontal position and vertical position of the difference coefficient in sub block serving as the decoding target, and at least one of (1) the significant sub block information of decoded sub blocks neighboring to the sub block serving as the decoding target, (2) the significant difference coefficient information of difference coefficients belonging to decoded sub blocks neighboring to the sub block serving as the decoding target, or (3) values of difference coefficients belonging to decoded sub blocks neighboring to the sub block serving as the decoding target.

* * * * *